(12) United States Patent
Hanson et al.

(10) Patent No.: US 9,435,120 B2
(45) Date of Patent: Sep. 6, 2016

(54) ACOUSTIC CEILING POPCORN TEXTURE MATERIALS, SYSTEMS, AND METHODS

(71) Applicant: Homax Products, Inc., Bellingham, WA (US)

(72) Inventors: Randal W. Hanson, Bellingham, WA (US); Jinru Bian, Bellingham, WA (US); John Kordosh, Simi Valley, CA (US); Jason Everett, Bellingham, WA (US); Jane D. Wasley, Bellingham, WA (US)

(73) Assignee: Homax Products, Inc., Bellingham, WA (US)

( * ) Notice: Subject to any disclaimer, the term of this patent is extended or adjusted under 35 U.S.C. 154(b) by 277 days.

(21) Appl. No.: 13/802,697

(22) Filed: Mar. 13, 2013

(65) Prior Publication Data

US 2014/0272140 A1 Sep. 18, 2014

(51) Int. Cl.
| | |
|---|---|
| *B65D 83/16* | (2006.01) |
| *E04B 9/00* | (2006.01) |
| *B65D 83/20* | (2006.01) |
| *B65D 83/22* | (2006.01) |
| *C09K 3/30* | (2006.01) |
| *B65D 83/14* | (2006.01) |
| *E04F 21/12* | (2006.01) |

(52) U.S. Cl.
CPC ............. *E04B 9/001* (2013.01); *B65D 83/202* (2013.01); *B65D 83/206* (2013.01); *B65D 83/22* (2013.01); *B65D 83/752* (2013.01); *C09K 3/30* (2013.01); *B65D 83/753* (2013.01); *E04F 21/12* (2013.01)

(58) Field of Classification Search
CPC .. B65D 83/202; B65D 83/206; B65D 83/22; B65D 83/752; B65D 83/753
See application file for complete search history.

(56) References Cited

U.S. PATENT DOCUMENTS

| | | | |
|---|---|---|---|
| 208,330 | A | 9/1878 | Palmer |
| 351,968 | A | 11/1886 | Derrick |
| D25,916 | S | 8/1896 | Woods |

(Continued)

FOREIGN PATENT DOCUMENTS

| | | |
|---|---|---|
| CA | 770467 | 10/1967 |
| CA | 976125 | 10/1975 |

(Continued)

OTHER PUBLICATIONS

Hazelton, "How to Refinish a Kitchen Table," Website http://www.ronhazelton.com/projects/how_to_refinish_a_kitchen_table, Sep. 23, 2011, 5 pages.

(Continued)

*Primary Examiner* — Dah-Wei D Yuan
*Assistant Examiner* — Stephen Kitt
(74) *Attorney, Agent, or Firm* — Michael R. Schacht

(57) ABSTRACT

An actuator for forming a texture layer on a target surface has a housing, a trigger, and an adapter. The housing supports the trigger for pivoting movement between first and second trigger positions. The housing supports the adapter member for sliding movement between first and second adapter positions. The trigger engages the adapter to displace the adapter from the first adapter position to the second adapter position as the trigger moves from the first trigger position to the second trigger position. The adapter engages a valve assembly such that the valve assembly is in closed and open configurations when the adapter is in the first and second adapter positions.

14 Claims, 12 Drawing Sheets

(56) References Cited

U.S. PATENT DOCUMENTS

| | | |
|---|---|---|
| 568,876 A | 10/1896 | Regan |
| 579,418 A | 3/1897 | Bookwalter |
| 582,397 A | 5/1897 | Shone |
| 658,586 A | 9/1900 | Reiling |
| 930,095 A | 8/1909 | Seagrave |
| 931,757 A | 8/1909 | Harmer |
| 941,671 A | 11/1909 | Campbell |
| 1,093,907 A | 4/1914 | Birnbaum |
| 1,154,974 A | 9/1915 | Custer |
| 1,486,156 A | 3/1924 | Needham |
| 2,127,188 A | 8/1938 | Schellin et al. |
| 2,149,930 A | 3/1939 | Plastaras |
| D134,562 S | 12/1942 | Murphy |
| 2,307,014 A | 1/1943 | Becker et al. |
| 2,320,964 A | 6/1943 | Yates |
| 2,353,318 A | 7/1944 | Scheller |
| 2,388,093 A | 10/1945 | Smith |
| 2,530,808 A | 11/1950 | Cerasi |
| 2,565,954 A | 8/1951 | Dey |
| 2,612,293 A | 9/1952 | Michel |
| 2,686,652 A | 8/1954 | Carlson et al. |
| 2,723,200 A | 11/1955 | Pyenson |
| 2,763,406 A | 9/1956 | Countryman |
| 2,764,454 A | 9/1956 | Edelstein |
| 2,785,926 A | 3/1957 | Lataste |
| 2,790,680 A | 4/1957 | Rosholt |
| 2,831,618 A | 4/1958 | Soffer et al. |
| 2,839,225 A | 6/1958 | Soffer et al. |
| 2,908,446 A | 10/1959 | Strouse |
| 2,932,434 A | 4/1960 | Abplanalp |
| 2,959,325 A | 11/1960 | Beard |
| 2,965,270 A | 12/1960 | Soffer et al. |
| 2,968,441 A | 1/1961 | Holcomb |
| 2,976,897 A | 3/1961 | Beckworth |
| 2,997,243 A | 8/1961 | Kolb |
| 3,061,203 A | 10/1962 | Kitabayashi |
| 3,083,872 A | 4/1963 | Meshberg |
| 3,107,059 A | 10/1963 | Frechette |
| 3,167,525 A | 1/1965 | Thomas |
| 3,191,809 A | 6/1965 | Schultz et al. |
| 3,196,819 A | 7/1965 | Lechner et al. |
| 3,198,394 A | 8/1965 | Lefer |
| 3,216,628 A | 11/1965 | Fergusson |
| 3,231,150 A | 1/1966 | Holm et al. |
| 3,246,850 A | 4/1966 | Bourke |
| 3,258,208 A | 6/1966 | Greenebaum, II |
| 3,284,007 A | 11/1966 | Clapp |
| 3,311,274 A | 3/1967 | Green |
| 3,314,571 A | 4/1967 | Greenebaum, II |
| 3,317,140 A | 5/1967 | Smith |
| 3,342,382 A | 9/1967 | Huling |
| 3,346,195 A | 10/1967 | Groth |
| 3,373,908 A | 3/1968 | Crowell |
| 3,377,028 A | 4/1968 | Bruggeman |
| 3,390,121 A | 6/1968 | Burford |
| 3,405,845 A | 10/1968 | Cook et al. |
| 3,414,171 A | 12/1968 | Grisham et al. |
| 3,415,425 A | 12/1968 | Knight et al. |
| 3,425,600 A | 2/1969 | Abplanalp |
| 3,428,224 A | 2/1969 | Eberhardt et al. |
| 3,433,391 A | 3/1969 | Krizka et al. |
| 3,450,314 A | 6/1969 | Gross |
| 3,467,283 A | 9/1969 | Kinnavy |
| 3,472,457 A | 10/1969 | McAvoy |
| 3,482,738 A | 12/1969 | Bartels |
| 3,513,886 A | 5/1970 | Easter et al. |
| 3,514,042 A | 5/1970 | Freed |
| 3,516,611 A | 6/1970 | Piggot |
| 3,544,258 A | 12/1970 | Presant et al. |
| 3,548,564 A | 12/1970 | Bruce et al. |
| 3,550,861 A | 12/1970 | Teson |
| 3,575,319 A | 4/1971 | Safianoff |
| 3,577,516 A | 5/1971 | Gould et al. |
| 3,592,359 A | 7/1971 | Marraffino |
| 3,596,835 A | 8/1971 | Smith et al. |
| 3,608,822 A | 9/1971 | Berthoud |
| 3,613,954 A | 10/1971 | Bayne |
| 3,648,932 A | 3/1972 | Ewald et al. |
| 3,653,558 A | 4/1972 | Shay |
| 3,698,645 A | 10/1972 | Coffey |
| 3,700,136 A | 10/1972 | Ruekberg |
| 3,703,994 A | 11/1972 | Nigro |
| 3,704,811 A | 12/1972 | Harden, Jr. |
| 3,704,831 A | 12/1972 | Clark |
| 3,705,669 A | 12/1972 | Cox et al. |
| 3,711,030 A | 1/1973 | Jones |
| 3,764,067 A | 10/1973 | Coffey et al. |
| 3,770,166 A | 11/1973 | Marand |
| 3,773,706 A | 11/1973 | Dunn, Jr. |
| 3,776,470 A | 12/1973 | Tsuchiya |
| 3,776,702 A | 12/1973 | Chant |
| 3,777,981 A | 12/1973 | Probst et al. |
| 3,788,521 A | 1/1974 | Laauwe |
| 3,795,366 A | 3/1974 | McGhie et al. |
| 3,799,398 A | 3/1974 | Morane et al. |
| 3,806,005 A | 4/1974 | Prussin et al. |
| 3,811,369 A | 5/1974 | Ruegg |
| 3,813,011 A | 5/1974 | Harrison et al. |
| 3,814,326 A | 6/1974 | Bartlett |
| 3,819,119 A | 6/1974 | Coffey et al. |
| 3,828,977 A | 8/1974 | Borchert |
| 3,848,778 A | 11/1974 | Meshberg |
| 3,862,705 A | 1/1975 | Beres et al. |
| 3,871,553 A | 3/1975 | Steinberg |
| 3,891,128 A | 6/1975 | Smrt |
| 3,912,132 A | 10/1975 | Stevens |
| 3,913,803 A | 10/1975 | Laauwe |
| 3,913,804 A | 10/1975 | Laauwe |
| 3,913,842 A | 10/1975 | Singer |
| 3,932,973 A | 1/1976 | Moore |
| 3,936,002 A | 2/1976 | Geberth, Jr. |
| 3,938,708 A | 2/1976 | Burger |
| 3,961,756 A | 6/1976 | Martini |
| 3,975,554 A | 8/1976 | Kummins et al. |
| 3,982,698 A | 9/1976 | Anderson |
| 3,989,165 A | 11/1976 | Shaw et al. |
| 3,991,916 A | 11/1976 | Del Bon |
| 3,992,003 A | 11/1976 | Visceglia et al. |
| 4,010,134 A | 3/1977 | Braunisch et al. |
| 4,032,064 A | 6/1977 | Giggard |
| 4,036,673 A | 7/1977 | Murphy et al. |
| 4,045,860 A | 9/1977 | Winckler |
| 4,089,443 A | 5/1978 | Zrinyi |
| 4,096,974 A | 6/1978 | Haber et al. |
| 4,117,951 A | 10/1978 | Winckler |
| 4,129,448 A | 12/1978 | Greenfield et al. |
| 4,147,284 A | 4/1979 | Mizzi |
| 4,148,416 A | 4/1979 | Gunn-Smith |
| 4,154,378 A | 5/1979 | Paoletti et al. |
| 4,164,492 A | 8/1979 | Cooper |
| RE30,093 E | 9/1979 | Burger |
| 4,171,757 A | 10/1979 | Diamond |
| 4,173,558 A | 11/1979 | Beck |
| 4,185,758 A | 1/1980 | Giggard |
| 4,187,959 A | 2/1980 | Pelton |
| 4,187,985 A | 2/1980 | Goth |
| 4,198,365 A | 4/1980 | Pelton |
| 4,202,470 A | 5/1980 | Fujii |
| 4,238,264 A | 12/1980 | Pelton |
| 4,240,940 A | 12/1980 | Vasishth et al. |
| 4,258,141 A | 3/1981 | Jarre et al. |
| 4,275,172 A | 6/1981 | Barth et al. |
| 4,293,353 A | 10/1981 | Pelton et al. |
| 4,308,973 A | 1/1982 | Irland |
| 4,310,108 A | 1/1982 | Motoyama et al. |
| 4,322,020 A | 3/1982 | Stone |
| 4,346,743 A | 8/1982 | Miller |
| 4,354,638 A | 10/1982 | Weinstein |
| 4,358,388 A | 11/1982 | Daniel et al. |
| 4,370,930 A | 2/1983 | Strasser et al. |
| 4,372,475 A | 2/1983 | Goforth et al. |
| 4,401,271 A | 8/1983 | Hansen |
| 4,401,272 A | 8/1983 | Merton et al. |
| 4,411,387 A | 10/1983 | Stern et al. |

(56) References Cited

U.S. PATENT DOCUMENTS

| | | |
|---|---|---|
| 4,417,674 A | 11/1983 | Giuffredi |
| 4,431,120 A | 2/1984 | Burger |
| 4,438,221 A | 3/1984 | Fracalossi et al. |
| 4,442,959 A | 4/1984 | Del Bon et al. |
| 4,460,719 A | 7/1984 | Danville |
| 4,482,662 A | 11/1984 | Rapaport et al. |
| 4,496,081 A | 1/1985 | Farrey |
| 4,546,905 A | 10/1985 | Nandagiri et al. |
| 4,595,127 A | 6/1986 | Stoody |
| 4,609,608 A | 9/1986 | Solc |
| 4,641,765 A | 2/1987 | Diamond |
| 4,683,246 A | 7/1987 | Davis et al. |
| 4,702,400 A | 10/1987 | Corbett |
| 4,728,007 A | 3/1988 | Samuelson et al. |
| D295,725 S | 5/1988 | Shioda |
| 4,744,495 A | 5/1988 | Warby |
| 4,761,312 A | 8/1988 | Koshi et al. |
| 4,792,062 A | 12/1988 | Goncalves |
| 4,793,162 A | 12/1988 | Emmons |
| 4,804,144 A | 2/1989 | Denman |
| 4,815,414 A | 3/1989 | Duffy et al. |
| 4,819,838 A | 4/1989 | Hart, Jr. |
| 4,830,224 A | 5/1989 | Brison |
| 4,839,393 A | 6/1989 | Buchanan et al. |
| 4,854,482 A | 8/1989 | Bergner |
| 4,870,805 A | 10/1989 | Morane |
| 4,878,599 A | 11/1989 | Greenway |
| 4,887,651 A | 12/1989 | Santiago |
| 4,893,730 A | 1/1990 | Bolduc |
| 4,896,832 A | 1/1990 | Howlett |
| D307,649 S | 5/1990 | Henry |
| 4,940,171 A | 7/1990 | Gilroy |
| 4,949,871 A | 8/1990 | Flanner |
| 4,953,759 A | 9/1990 | Schmidt |
| 4,954,544 A | 9/1990 | Chandaria |
| 4,955,545 A | 9/1990 | Stern et al. |
| 4,961,537 A | 10/1990 | Stern |
| 4,969,577 A | 11/1990 | Werding |
| 4,969,579 A | 11/1990 | Behar |
| 4,988,017 A | 1/1991 | Schrader et al. |
| 4,991,750 A | 2/1991 | Moral |
| 5,007,556 A | 4/1991 | Lover |
| 5,009,390 A | 4/1991 | McAuliffe, Jr. et al. |
| 5,014,887 A | 5/1991 | Kopp |
| 5,037,011 A | 8/1991 | Woods |
| 5,038,964 A | 8/1991 | Bouix |
| 5,052,585 A | 10/1991 | Bolduc |
| 5,059,187 A | 10/1991 | Sperry et al. |
| 5,065,900 A | 11/1991 | Scheindel |
| 5,069,390 A | 12/1991 | Stern et al. |
| 5,083,685 A | 1/1992 | Amemiya et al. |
| 5,100,055 A | 3/1992 | Rokitenetz et al. |
| 5,115,944 A | 5/1992 | Nikolich |
| 5,126,086 A | 6/1992 | Stoffel |
| 5,169,037 A | 12/1992 | Davies et al. |
| 5,179,982 A | 1/1993 | Berube et al. |
| 5,182,316 A | 1/1993 | DeVoe et al. |
| 5,185,197 A | 2/1993 | Nixon |
| 5,188,263 A | 2/1993 | Woods |
| 5,188,295 A | 2/1993 | Stern et al. |
| 5,211,317 A | 5/1993 | Diamond et al. |
| 5,219,609 A | 6/1993 | Owens |
| 5,250,599 A | 10/1993 | Swartz |
| 5,277,336 A | 1/1994 | Youel |
| 5,297,704 A | 3/1994 | Stollmeyer |
| 5,307,964 A | 5/1994 | Toth |
| 5,308,397 A | 5/1994 | Whatcott |
| 5,310,095 A | 5/1994 | Stern et al. |
| 5,312,888 A | 5/1994 | Nafziger et al. |
| 5,314,097 A | 5/1994 | Smrt et al. |
| 5,323,963 A | 6/1994 | Ballu |
| 5,341,970 A | 8/1994 | Woods |
| 5,342,597 A | 8/1994 | Tunison, III |
| 5,368,207 A | 11/1994 | Cruysberghs |
| 5,374,434 A | 12/1994 | Clapp et al. |
| 5,405,051 A | 4/1995 | Miskell |
| 5,409,148 A | 4/1995 | Stern et al. |
| 5,417,357 A | 5/1995 | Yquel |
| 5,418,013 A | 5/1995 | Detrick et al. |
| D358,989 S | 6/1995 | Woods |
| 5,421,519 A | 6/1995 | Woods |
| 5,425,824 A | 6/1995 | Marwick |
| 5,450,983 A | 9/1995 | Stern et al. |
| 5,467,902 A | 11/1995 | Yquel |
| 5,476,879 A | 12/1995 | Woods et al. |
| 5,489,048 A | 2/1996 | Stern et al. |
| 5,498,282 A | 3/1996 | Miller et al. |
| 5,501,375 A | 3/1996 | Nilson |
| 5,505,344 A | 4/1996 | Woods |
| 5,523,798 A | 6/1996 | Hagino et al. |
| 5,524,798 A | 6/1996 | Stern et al. |
| 5,544,783 A | 8/1996 | Conigliaro |
| 5,548,010 A | 8/1996 | Franer |
| 5,549,226 A | 8/1996 | Kopp |
| 5,549,228 A | 8/1996 | Brown |
| 5,558,247 A | 9/1996 | Caso |
| 5,562,235 A | 10/1996 | Cruysberghs |
| D375,890 S | 11/1996 | Takai |
| 5,570,813 A | 11/1996 | Clark, II |
| 5,573,137 A | 11/1996 | Pauls |
| 5,583,178 A | 12/1996 | Oxman et al. |
| 5,597,095 A | 1/1997 | Ferrara, Jr. |
| 5,615,804 A | 4/1997 | Brown |
| 5,639,026 A | 6/1997 | Woods |
| 5,641,095 A | 6/1997 | de Laforcade |
| 5,645,198 A | 7/1997 | Stern et al. |
| 5,655,691 A | 8/1997 | Stern et al. |
| 5,695,788 A | 12/1997 | Woods |
| 5,715,975 A | 2/1998 | Stern et al. |
| 5,727,736 A | 3/1998 | Tryon |
| 5,752,631 A | 5/1998 | Yabuno et al. |
| 5,762,319 A | 6/1998 | Kopp |
| 5,775,432 A | 7/1998 | Burns et al. |
| 5,788,129 A | 8/1998 | Markos |
| 5,788,214 A | 8/1998 | Kopp |
| 5,792,465 A | 8/1998 | Hagarty |
| 5,799,879 A | 9/1998 | Ottl et al. |
| 5,865,351 A | 2/1999 | De Laforcade |
| 5,868,286 A | 2/1999 | Mascitelli |
| 5,887,756 A | 3/1999 | Brown |
| 5,894,964 A | 4/1999 | Barnes et al. |
| 5,915,598 A | 6/1999 | Yazawa et al. |
| 5,921,446 A | 7/1999 | Stern |
| 5,934,518 A | 8/1999 | Stern et al. |
| 5,941,462 A | 8/1999 | Sandor |
| 5,957,333 A | 9/1999 | Losenno et al. |
| 5,975,356 A | 11/1999 | Yquel et al. |
| 5,988,575 A | 11/1999 | Lesko |
| 5,997,891 A | 12/1999 | Fuerst et al. |
| 6,000,583 A | 12/1999 | Stern et al. |
| 6,027,042 A | 2/2000 | Smith |
| 6,032,830 A | 3/2000 | Brown |
| 6,039,306 A | 3/2000 | Pericard et al. |
| 6,058,960 A | 5/2000 | Kopp |
| 6,062,494 A | 5/2000 | Mills |
| 6,070,770 A | 6/2000 | Tada et al. |
| 6,092,698 A | 7/2000 | Bayer |
| 6,095,435 A | 8/2000 | Greer, Jr. et al. |
| 6,112,945 A | 9/2000 | Woods |
| 6,113,070 A | 9/2000 | Holzboog |
| 6,116,473 A | 9/2000 | Stern et al. |
| 6,129,247 A | 10/2000 | Thomas et al. |
| 6,131,777 A | 10/2000 | Warby |
| 6,139,821 A | 10/2000 | Fuerst et al. |
| 6,152,335 A | 11/2000 | Stern et al. |
| 6,161,735 A | 12/2000 | Uchiyama et al. |
| 6,168,093 B1 | 1/2001 | Greer, Jr. et al. |
| 6,170,717 B1 | 1/2001 | Di Giovanni et al. |
| D438,111 S | 2/2001 | Woods |
| 6,225,393 B1 | 5/2001 | Woods |
| 6,254,015 B1 | 7/2001 | Abplanalp |
| 6,257,503 B1 | 7/2001 | Baudin |
| 6,261,631 B1 | 7/2001 | Lomasney et al. |
| 6,265,459 B1 | 7/2001 | Mahoney et al. |

(56) References Cited

U.S. PATENT DOCUMENTS

| | | |
|---|---|---|
| 6,276,570 B1 | 8/2001 | Stern et al. |
| 6,283,171 B1 | 9/2001 | Blake |
| 6,284,077 B1 | 9/2001 | Lucas et al. |
| 6,290,104 B1 | 9/2001 | Bougamont et al. |
| 6,291,536 B1 | 9/2001 | Taylor |
| 6,296,155 B1 | 10/2001 | Smith |
| 6,296,156 B1 | 10/2001 | Lasserre et al. |
| 6,299,679 B1 | 10/2001 | Montoya |
| 6,299,686 B1 | 10/2001 | Mills |
| 6,315,152 B1 | 11/2001 | Kalisz |
| 6,325,256 B1 | 12/2001 | Liljeqvist et al. |
| 6,328,185 B1 | 12/2001 | Stern et al. |
| 6,328,197 B1 | 12/2001 | Gapihan |
| 6,333,365 B1 | 12/2001 | Lucas et al. |
| 6,352,184 B1 | 3/2002 | Stern et al. |
| 6,362,302 B1 | 3/2002 | Boddie |
| 6,375,036 B1 | 4/2002 | Woods |
| 6,382,474 B1 | 5/2002 | Woods et al. |
| 6,386,402 B1 | 5/2002 | Woods |
| 6,394,321 B1 | 5/2002 | Bayer |
| 6,394,364 B1 | 5/2002 | Abplanalp |
| 6,395,794 B2 | 5/2002 | Lucas et al. |
| 6,398,082 B2 | 6/2002 | Clark et al. |
| 6,399,687 B2 | 6/2002 | Woods |
| 6,408,492 B1 | 6/2002 | Sparks et al. |
| 6,412,657 B2 | 7/2002 | Riley et al. |
| 6,414,044 B2 | 7/2002 | Taylor |
| 6,415,964 B2 | 7/2002 | Woods |
| 6,439,430 B1 | 8/2002 | Gilroy, Sr. et al. |
| 6,446,842 B2 | 9/2002 | Stern et al. |
| D464,395 S | 10/2002 | Huang |
| 6,474,513 B2 | 11/2002 | Burt |
| 6,478,198 B2 | 11/2002 | Haroian |
| 6,478,561 B2 | 11/2002 | Braun et al. |
| 6,482,392 B1 | 11/2002 | Zhou et al. |
| D468,980 S | 1/2003 | Woods |
| 6,510,969 B2 | 1/2003 | Di Giovanni et al. |
| 6,520,377 B2 | 2/2003 | Yquel |
| 6,531,528 B1 | 3/2003 | Kurp |
| 6,536,633 B2 | 3/2003 | Stern et al. |
| 6,581,807 B1 | 6/2003 | Mekata |
| 6,588,628 B2 | 7/2003 | Abplanalp et al. |
| 6,595,393 B1 | 7/2003 | Loghman-Adham et al. |
| 6,607,106 B2 | 8/2003 | Henry et al. |
| 6,613,186 B2 | 9/2003 | Johnson |
| 6,615,827 B2 | 9/2003 | Greenwood et al. |
| 6,637,627 B1 | 10/2003 | Liljeqvist et al. |
| 6,641,005 B1 | 11/2003 | Stern et al. |
| 6,641,864 B2 | 11/2003 | Woods |
| 6,652,704 B2 | 11/2003 | Green |
| 6,659,312 B1 | 12/2003 | Stern et al. |
| 6,666,352 B1 | 12/2003 | Woods |
| 6,688,492 B2 | 2/2004 | Jaworski et al. |
| 6,712,238 B1 | 3/2004 | Mills |
| 6,726,066 B2 | 4/2004 | Woods |
| 6,736,288 B1 | 5/2004 | Green |
| 6,758,373 B2 | 7/2004 | Jackson et al. |
| 6,797,051 B2 | 9/2004 | Woods |
| 6,802,461 B2 | 10/2004 | Schneider |
| 6,831,110 B2 | 12/2004 | Ingold et al. |
| 6,832,704 B2 | 12/2004 | Smith |
| 6,837,396 B2 | 1/2005 | Jaworski et al. |
| 6,843,392 B1 | 1/2005 | Walker |
| D501,538 S | 2/2005 | Zeng |
| D501,914 S | 2/2005 | Chen |
| 6,848,601 B2 | 2/2005 | Greer, Jr. |
| 6,851,575 B2 | 2/2005 | van't Hoff |
| D502,533 S | 3/2005 | Chen |
| 6,880,733 B2 | 4/2005 | Park |
| 6,883,688 B1 | 4/2005 | Stern et al. |
| 6,894,095 B2 | 5/2005 | Russo et al. |
| 6,905,050 B1 | 6/2005 | Stern et al. |
| 6,910,608 B2 | 6/2005 | Greer, Jr. et al. |
| 6,913,407 B2 | 7/2005 | Greer et al. |
| 6,926,178 B1 | 8/2005 | Anderson |
| 6,929,154 B2 | 8/2005 | Grey et al. |
| 6,932,244 B2 | 8/2005 | Meshberg |
| 6,966,467 B2 | 11/2005 | Di Giovanni et al. |
| D512,309 S | 12/2005 | Geier |
| 6,971,353 B2 | 12/2005 | Heinze et al. |
| 6,971,553 B2 | 12/2005 | Brennan et al. |
| 6,978,916 B2 | 12/2005 | Smith |
| 6,978,947 B2 | 12/2005 | Jin |
| 6,981,616 B2 | 1/2006 | Loghman-Adham et al. |
| 7,014,073 B1 | 3/2006 | Stern et al. |
| 7,014,127 B2 | 3/2006 | Valpey, III et al. |
| 7,036,685 B1 | 5/2006 | Green |
| 7,045,008 B2 | 5/2006 | Langford |
| 7,059,497 B2 | 6/2006 | Woods |
| 7,059,546 B2 | 6/2006 | Ogata et al. |
| 7,063,236 B2 | 6/2006 | Greer, Jr. et al. |
| 7,104,424 B2 | 9/2006 | Kolanus |
| 7,104,427 B2 | 9/2006 | Pericard et al. |
| 7,121,434 B1 | 10/2006 | Caruso |
| 7,163,962 B2 | 1/2007 | Woods |
| 7,182,227 B2 | 2/2007 | Poile et al. |
| 7,189,022 B1 | 3/2007 | Greer, Jr. et al. |
| 7,192,985 B2 | 3/2007 | Woods |
| 7,204,393 B2 | 4/2007 | Strand |
| 7,226,001 B1 | 6/2007 | Stern et al. |
| 7,226,232 B2 | 6/2007 | Greer, Jr. et al. |
| 7,232,047 B2 | 6/2007 | Greer, Jr. et al. |
| 7,237,697 B2 | 7/2007 | Dunne |
| 7,240,857 B1 | 7/2007 | Stern et al. |
| 7,249,692 B2 | 7/2007 | Walters et al. |
| 7,261,225 B2 | 8/2007 | Rueschhoff et al. |
| 7,267,248 B2 | 9/2007 | Yerby et al. |
| 7,278,590 B1 | 10/2007 | Greer, Jr. et al. |
| 7,303,152 B2 | 12/2007 | Woods |
| 7,307,053 B2 | 12/2007 | Tasz et al. |
| 7,337,985 B1 | 3/2008 | Greer, Jr. et al. |
| 7,341,169 B2 | 3/2008 | Bayer |
| 7,350,676 B2 | 4/2008 | Di Giovanni et al. |
| 7,374,068 B2 | 5/2008 | Greer, Jr. |
| 7,383,968 B2 | 6/2008 | Greer, Jr. et al. |
| 7,383,970 B2 | 6/2008 | Anderson |
| 7,445,166 B2 | 11/2008 | Williams |
| 7,448,517 B2 | 11/2008 | Shieh et al. |
| 7,481,338 B1 | 1/2009 | Stern et al. |
| 7,487,891 B2 | 2/2009 | Yerby et al. |
| 7,487,893 B1 | 2/2009 | Greer, Jr. et al. |
| 7,494,075 B2 | 2/2009 | Schneider |
| 7,500,621 B2 | 3/2009 | Tryon et al. |
| 7,510,102 B2 | 3/2009 | Schmitt |
| 7,556,841 B2 | 7/2009 | Kimball et al. |
| D600,119 S | 9/2009 | Sweeton |
| 7,588,171 B2 | 9/2009 | Reedy et al. |
| 7,597,274 B1 | 10/2009 | Stern et al. |
| 7,600,659 B1 | 10/2009 | Greer, Jr. et al. |
| 7,624,932 B1 | 12/2009 | Greer, Jr. et al. |
| 7,631,785 B2 | 12/2009 | Paas et al. |
| 7,641,079 B2 | 1/2010 | Lott et al. |
| 7,673,816 B1 | 3/2010 | Stern et al. |
| 7,677,420 B1 | 3/2010 | Greer, Jr. et al. |
| 7,699,190 B2 | 4/2010 | Hygema |
| 7,721,920 B2 | 5/2010 | Ruiz De Gopegui et al. |
| 7,744,299 B1 | 6/2010 | Greer, Jr. et al. |
| 7,748,572 B2 | 7/2010 | Althoff et al. |
| 7,757,905 B2 | 7/2010 | Strand et al. |
| 7,766,196 B2 | 8/2010 | Sugano et al. |
| 7,775,408 B2 | 8/2010 | Yamamoto et al. |
| 7,784,647 B2 | 8/2010 | Tourigny |
| 7,784,649 B2 | 8/2010 | Greer, Jr. |
| 7,789,278 B2 | 9/2010 | Ruiz de Gopegui et al. |
| 7,845,523 B1 | 12/2010 | Greer, Jr. et al. |
| 7,854,356 B2 | 12/2010 | Eberhardt |
| 7,861,894 B2 | 1/2011 | Walters et al. |
| 7,886,995 B2 | 2/2011 | Togashi |
| 7,891,529 B2 | 2/2011 | Paas et al. |
| 7,913,877 B2 | 3/2011 | Neuhalfen |
| 7,922,041 B2 | 4/2011 | Gurrisi et al. |
| 7,926,741 B2 | 4/2011 | Laidler et al. |
| 7,947,753 B2 | 5/2011 | Greer, Jr. |
| 7,980,487 B2 | 7/2011 | Mirazita et al. |

(56) References Cited

U.S. PATENT DOCUMENTS

| | | |
|---|---|---|
| 7,984,827 B2 | 7/2011 | Hygema |
| 7,984,834 B2 | 7/2011 | McBroom et al. |
| 7,997,511 B2 | 8/2011 | Reynolds et al. |
| 8,006,868 B2 | 8/2011 | Geiberger et al. |
| 8,016,163 B2 | 9/2011 | Behar et al. |
| 8,025,189 B2 | 9/2011 | Salameh |
| 8,028,861 B2 | 10/2011 | Brouwer |
| 8,028,864 B2 | 10/2011 | Stern et al. |
| 8,033,432 B2 | 10/2011 | Pardonge et al. |
| 8,033,484 B2 | 10/2011 | Tryon et al. |
| 8,038,077 B1 | 10/2011 | Greer, Jr. et al. |
| 8,042,713 B2 | 10/2011 | Greer, Jr. et al. |
| 8,070,017 B2 | 12/2011 | Green |
| 8,074,847 B2 | 12/2011 | Smith |
| 8,074,848 B2 | 12/2011 | Pittl et al. |
| 8,083,159 B2 | 12/2011 | Leuliet et al. |
| 8,087,548 B2 | 1/2012 | Kimball |
| 8,087,552 B2 | 1/2012 | Fazekas et al. |
| 8,128,008 B2 | 3/2012 | Chevalier |
| 8,132,697 B2 | 3/2012 | Finlay et al. |
| 8,276,832 B2 | 10/2012 | Nelson et al. |
| 8,344,056 B1 | 1/2013 | Tait et al. |
| 8,840,038 B2 | 9/2014 | Lehr |
| 8,844,765 B2 | 9/2014 | Tryon |
| 2002/0003147 A1 | 1/2002 | Corba |
| 2002/0100769 A1 | 8/2002 | McKune |
| 2002/0108339 A1 | 8/2002 | Adebar et al. |
| 2002/0119256 A1 | 8/2002 | Woods |
| 2003/0134973 A1 | 7/2003 | Chen et al. |
| 2003/0205580 A1 | 11/2003 | Yahav |
| 2004/0141797 A1 | 7/2004 | Garabedian et al. |
| 2004/0154264 A1 | 8/2004 | Colbert |
| 2004/0157960 A1 | 8/2004 | Rowe |
| 2005/0121474 A1 | 6/2005 | Lasserre et al. |
| 2005/0236436 A1 | 10/2005 | Woods |
| 2005/0256257 A1 | 11/2005 | Betremieux et al. |
| 2006/0049205 A1 | 3/2006 | Green |
| 2006/0180612 A1* | 8/2006 | Paas et al. ............... 222/182 |
| 2006/0180616 A1 | 8/2006 | Woods |
| 2006/0219808 A1 | 10/2006 | Woods |
| 2006/0219811 A1 | 10/2006 | Woods |
| 2006/0273207 A1 | 12/2006 | Woods |
| 2007/0117916 A1 | 5/2007 | Anderson et al. |
| 2007/0119984 A1 | 5/2007 | Woods |
| 2007/0125879 A1 | 6/2007 | Khamenian |
| 2007/0155892 A1 | 7/2007 | Gharapetian et al. |
| 2007/0178243 A1 | 8/2007 | Houck et al. |
| 2007/0194040 A1 | 8/2007 | Tasz et al. |
| 2007/0219310 A1 | 9/2007 | Woods |
| 2007/0228086 A1 | 10/2007 | Delande et al. |
| 2007/0260011 A1 | 11/2007 | Woods |
| 2007/0272765 A1 | 11/2007 | Kwasny |
| 2007/0272768 A1 | 11/2007 | Williams et al. |
| 2007/0290006 A1* | 12/2007 | Lott et al. ............... 222/402.13 |
| 2008/0008678 A1 | 1/2008 | Wyers |
| 2008/0017671 A1 | 1/2008 | Shieh et al. |
| 2008/0029551 A1 | 2/2008 | Lombardi |
| 2008/0033099 A1 | 2/2008 | Bosway |
| 2008/0041887 A1 | 2/2008 | Scheindel |
| 2008/0164347 A1 | 7/2008 | Leuliet et al. |
| 2009/0004468 A1 | 1/2009 | Chen et al. |
| 2009/0020621 A1* | 1/2009 | Clark et al. ............... 239/8 |
| 2009/0283545 A1 | 11/2009 | Kimball |
| 2010/0108716 A1 | 5/2010 | Bilko |
| 2010/0147897 A1 | 6/2010 | Kopp |
| 2010/0155432 A1 | 6/2010 | Christianson |
| 2010/0200612 A1 | 8/2010 | Smith |
| 2010/0322892 A1 | 12/2010 | Burke |
| 2011/0021675 A1 | 1/2011 | Shigemori et al. |
| 2011/0101025 A1 | 5/2011 | Walters et al. |
| 2011/0127300 A1 | 6/2011 | Ghavami-Nasr et al. |
| 2011/0210141 A1 | 9/2011 | Maas et al. |
| 2011/0210184 A1 | 9/2011 | Maas et al. |
| 2011/0215119 A1 | 9/2011 | McBroom |
| 2011/0218096 A1 | 9/2011 | Hatanaka et al. |
| 2011/0220685 A1 | 9/2011 | Lind et al. |
| 2011/0233235 A1 | 9/2011 | Adams et al. |
| 2011/0240682 A1 | 10/2011 | Miyamoto et al. |
| 2011/0240771 A1 | 10/2011 | Legeza |
| 2011/0253749 A1 | 10/2011 | Hygema |
| 2011/0257302 A1 | 10/2011 | Terrenoire et al. |
| 2011/0266310 A1 | 11/2011 | Tomkins et al. |
| 2012/0000930 A1 | 1/2012 | Barbieri |
| 2012/0000931 A1 | 1/2012 | Cabiri et al. |
| 2012/0006858 A1 | 1/2012 | Rovelli |
| 2012/0006859 A1 | 1/2012 | Wilkinson et al. |
| 2012/0032000 A1 | 2/2012 | Brunk et al. |
| 2012/0043353 A1 | 2/2012 | Davideit et al. |
| 2012/0048959 A1 | 3/2012 | Maas et al. |
| 2013/0026252 A1 | 1/2013 | Hanson et al. |

FOREIGN PATENT DOCUMENTS

| | | |
|---|---|---|
| CA | 1191493 | 8/1985 |
| CA | 1210371 | 8/1986 |
| CA | 2145129 | 9/1995 |
| CA | 2090185 | 10/1998 |
| CA | 2224042 | 6/1999 |
| CA | 2291599 | 6/2000 |
| CA | 2381994 | 2/2001 |
| CA | 2327903 | 6/2001 |
| CA | 2065534 | 8/2003 |
| CA | 2448794 | 12/2004 |
| CA | 2504509 | 10/2005 |
| CA | 2504513 | 10/2005 |
| CH | 677457 | 5/1991 |
| CH | 680849 | 11/1992 |
| DE | 1926796 | 3/1970 |
| DE | 3606018 C1 | 6/1987 |
| DE | 3808438 | 4/1989 |
| DE | 3806991 | 9/1989 |
| EP | 2130788 | 12/2009 |
| EP | 2130788 A1 | 12/2009 |
| FR | 463476 | 2/1914 |
| FR | 84727 | 9/1965 |
| FR | 1586067 | 2/1970 |
| FR | 2659847 | 9/1991 |
| GB | 867713 | 5/1961 |
| GB | 970766 | 9/1964 |
| GB | 977860 | 12/1964 |
| GB | 1144385 | 3/1969 |
| GB | 2418959 | 12/2006 |
| JP | 461392 | 1/1971 |
| JP | 55142073 | 11/1980 |
| JP | 8332414 | 12/1996 |
| WO | 8607037 A1 | 12/1986 |
| WO | 9418094 | 8/1994 |
| WO | 2005087617 | 9/2005 |
| WO | 2005087617 A1 | 9/2005 |
| WO | 2005108240 | 11/2005 |
| WO | 2006090229 | 8/2006 |
| WO | 2008060157 | 5/2008 |

OTHER PUBLICATIONS

EPO, Partial European Search Report, EP14157672, Jul. 25, 2014, 3 pages.

ATSM, "Standard Test Method for Conducting Cyclic Potentiodynamic Polarization Measurements for Localized Corrosion Susceptibility of Iron—Nickel, or Cobalt-Based Alloys," 1993, 5 pages.

Chadwick, "Controlling Particle Size in Self-Pressurized Aerosol Packages," Metal Finishing, Aug. 2004, 3 pages, vol. 102, No. 718.

Homax Products, Inc., "Easy Touch Spray Texture Brochure", Mar. 1992, 1 page.

Newman-Green, Inc., "Aerosol Valves, Sprayheads & Accessories Catalog", Apr. 1, 1992, pp. 14, 20, and 22.

Tait, "An Introduction to Electrochemical Corrosion Testing for Practicing Engineers and Scientists," 1994, 17 pages, PairODocs Publications, Racine, Wisconsin.

\* cited by examiner

ACOUSTIC CEILING POPCORN TEXTURE MATERIALS, SYSTEMS, AND METHODS

TECHNICAL FIELD

The present invention relates to aerosol systems and methods for dispensing texture material and, more specifically, aerosol systems and methods configured to dispense acoustic texture material onto ceiling surfaces.

BACKGROUND

Acoustic or "popcorn" texture material is applied to interior surfaces of structures, and typically ceiling surfaces. Acoustic texture material comprises a base material and aggregate material in the form of visible chips or beads. The aggregate material is adhered to the target surface by the base material. In new construction, the acoustic texture material is applied by a hopper gun, and the chips or beads are typically formed of polystyrene foam. The polystyrene foam chips act to dampen sound waves that would otherwise reflect off the target surface.

When acoustic texture material on a target surface or the target surface itself is damaged, a new coating of texture material is applied. For small repairs, the use of a hopper gun is not practical, and acoustic texture material is applied using an aerosol dispenser.

The need exists for improved aerosol dispensing systems and methods configured to apply acoustic texture material to a target surface such as a ceiling surface.

SUMMARY

The present invention may be embodied as an aerosol dispensing system for forming a texture layer on a target surface comprising an aerosol assembly, an actuator assembly, and at least one outlet tube. The aerosol assembly adapted to contain acoustic texture material and comprises a container assembly and a valve assembly arranged to operate in open and closed configurations. The valve assembly is biased in the closed position. The valve assembly is supported by the container assembly such that the acoustic texture material is allowed to flow out of the container assembly when the valve assembly is in the open configuration and the acoustic texture material is prevented from flowing out of the container when the valve assembly is in the closed configuration. The actuator assembly comprises a housing, a trigger, and an adapter defining an adapter opening. The housing supports the trigger for pivoting movement between first and second trigger positions. The housing supports the adapter member for sliding movement between first and second adapter positions. The trigger engages the adapter to displace the adapter from the first adapter position to the second adapter position as the trigger moves from the first trigger position to the second trigger position. The adapter engages the valve assembly such that the valve assembly is in the closed configuration when the adapter is in the first adapter position, the adapter moves the valve assembly into the open configuration when the adapter is in the second adapter position, and, when the valve assembly is in the open configuration, acoustic texture material flows from the valve assembly and through the adapter opening. The at least one outlet tube defines an outlet passageway and an outlet opening. The adapter supports the at least one outlet tube such that acoustic texture material flowing through the adapter opening when the valve assembly is in the open configuration flows into the outlet passageway. The outlet tube is arranged such that acoustic texture material flowing through the outlet passageway flows out of the outlet opening and out of the housing.

The present invention may be embodied as a method of forming a texture layer on a target surface comprising the following steps. An aerosol assembly adapted to contain acoustic texture material is provided. The aerosol assembly comprises a container assembly and a valve assembly arranged to operate in open and closed configurations. The valve assembly is biased in the closed position. The valve assembly is supported on the container assembly such that the acoustic texture material is allowed to flow out of the container assembly when the valve assembly is in the open configuration and the acoustic texture material is prevented from flowing out of the container when the valve assembly is in the closed configuration. An actuator assembly comprising a housing, a trigger, and an adapter defining an adapter opening is provided. The adapter member is supported on the housing for sliding movement between first and second adapter positions such that the valve assembly is in the closed configuration when the adapter is in the first adapter position, the adapter moves the valve assembly into the open configuration when the adapter is in the second adapter position, and, when the valve assembly is in the open configuration, acoustic texture material flows from the valve assembly and through the adapter opening. The trigger is supported on the housing for pivoting movement between first and second trigger positions such that the trigger engages the adapter to displace the adapter from the first adapter position to the second adapter position as the trigger moves from the first trigger position to the second trigger position. At least one outlet tube defining an outlet passageway and an outlet opening is provided. The at least one outlet tube is arranged such that the adapter supports the at least one outlet tube. The trigger member is displaced into the second trigger position such that valve assembly is in the open configuration to allow acoustic texture material to flow through the adapter opening, through the outlet passageway, out of the outlet opening, and out of the housing.

The present invention may also be embodied as an acoustic texture material concentrate comprising, by weight of the acoustic texture material concentrate, between 2% and 10% of a first solvent, between 2% and 20% of a second solvent, between 2% and 15% of a diluent, between 5% and 10% of a binder, between 1% and 2.5% of a thickener, between 0.1% and 1% of a dispersing agent, and between 40% and 80% of a filler.

The present invention may also be embodied as acoustic texture material concentrate comprising, by weight of the acoustic texture material concentrate, between 15% and 60% of a solvent, between 0.31% and 10.0% of a thickener, between 0.0% and 3.0% of a de-foamer, between 0% and 5.0% of a corrosion inhibitor, between 0% and 6% of a biocide, between 1.0% and 10.0% of a binder, between 0.0% and 3.0% of a dispersing agent, and between 20% and 90% of a filler.

DETAILED DESCRIPTION

Figure 1:
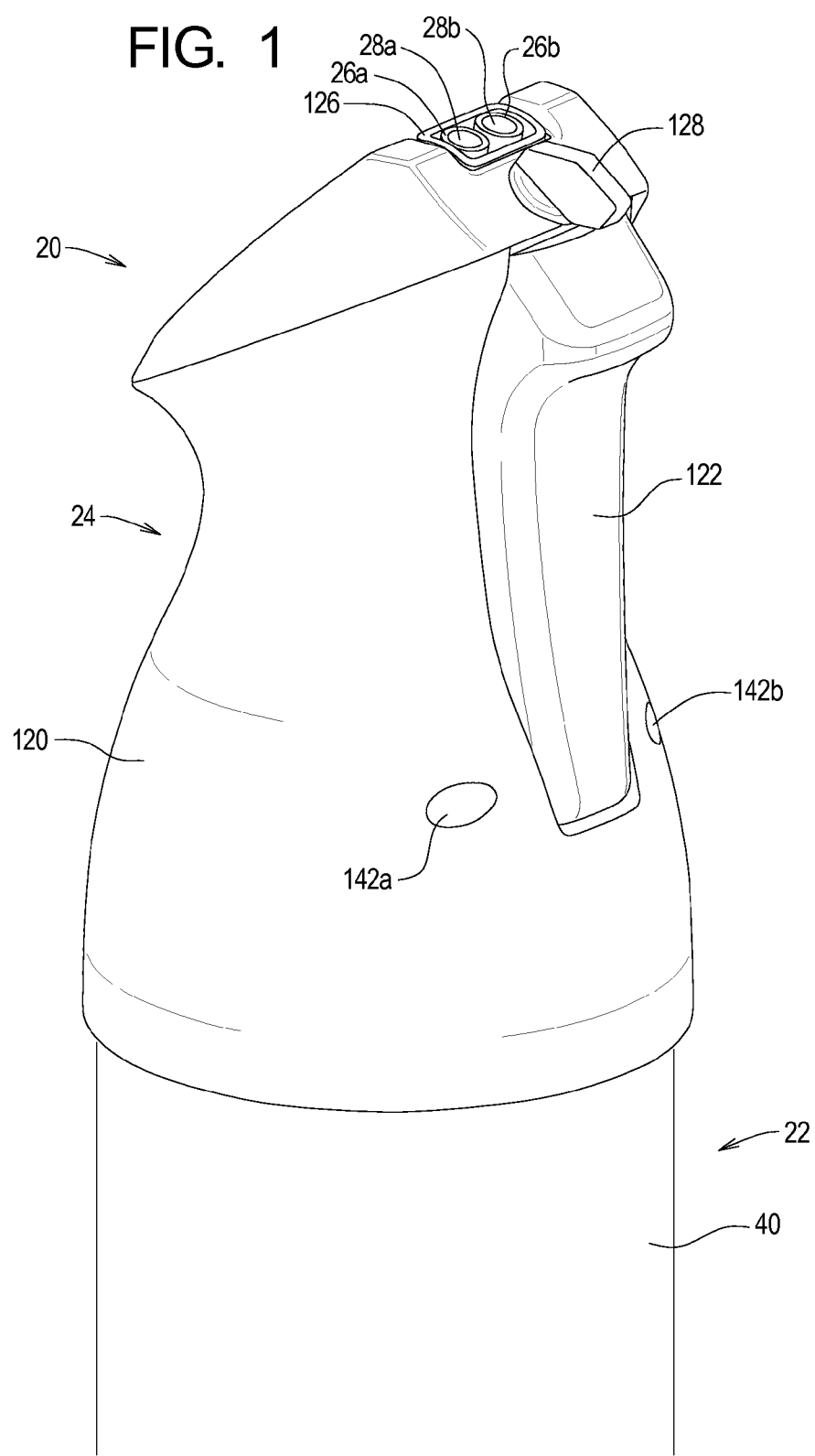
FIG. 1 is a perspective view of a first example aerosol dispensing system of the present invention.
Figure 3:
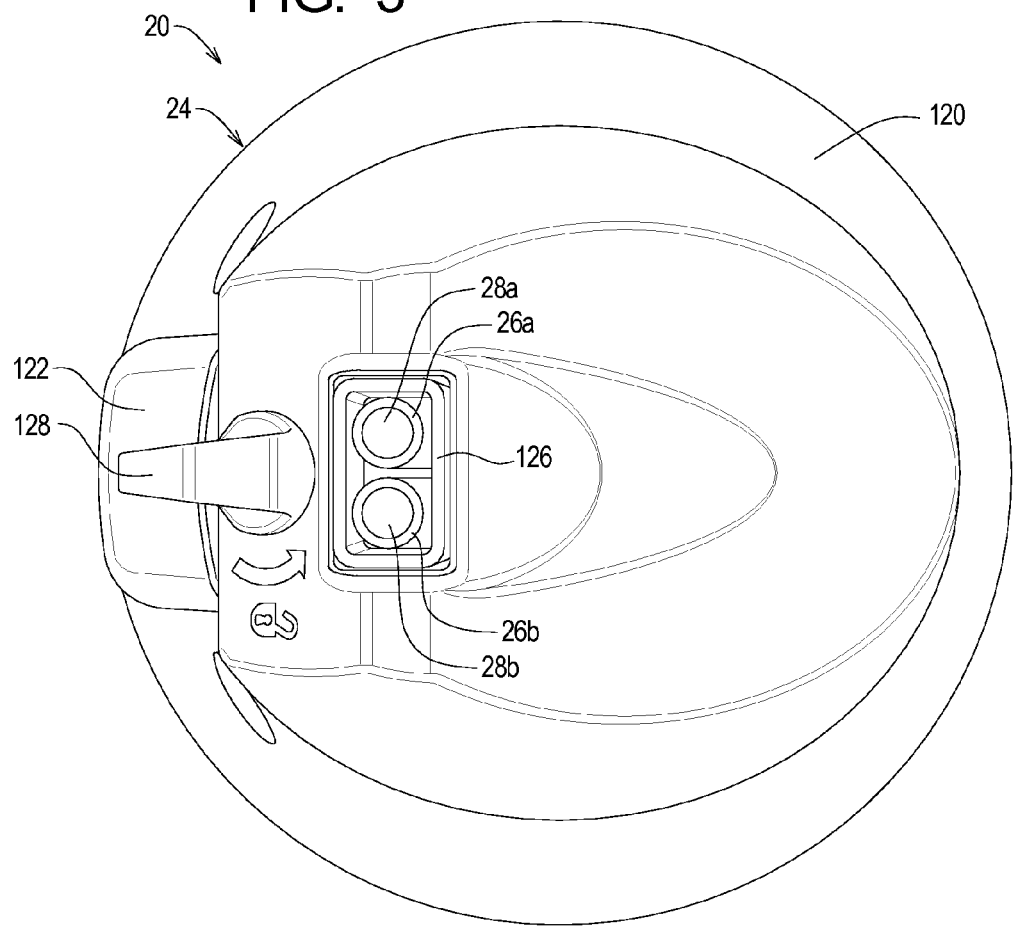
FIG. 3 is a top plan view of the first example aerosol dispensing system.
Figure 4:
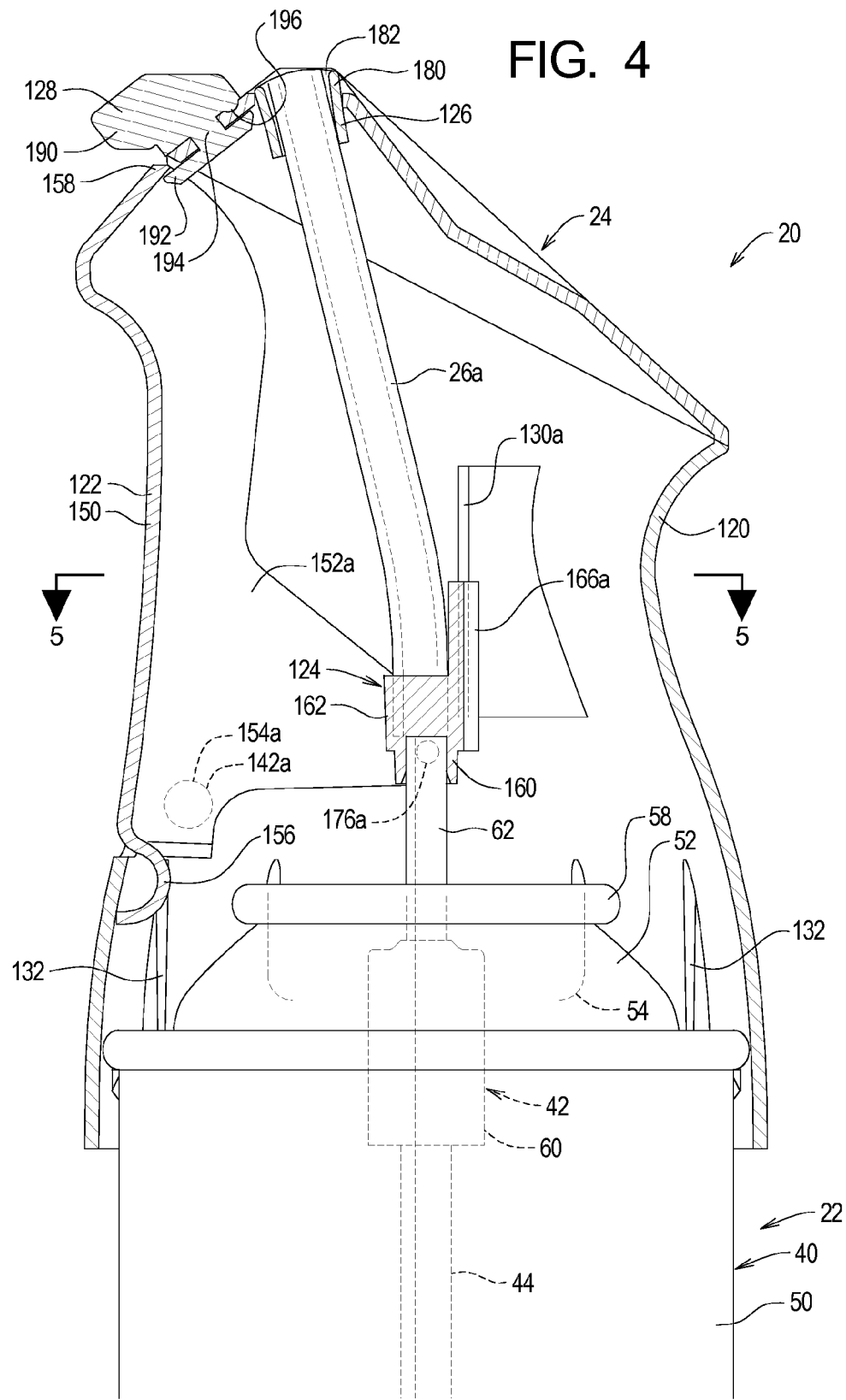
FIG. 4 is a partial section view illustrating an aerosol assembly, actuator assembly, and outlet tubes of the first example aerosol dispensing system.
Figure 5:
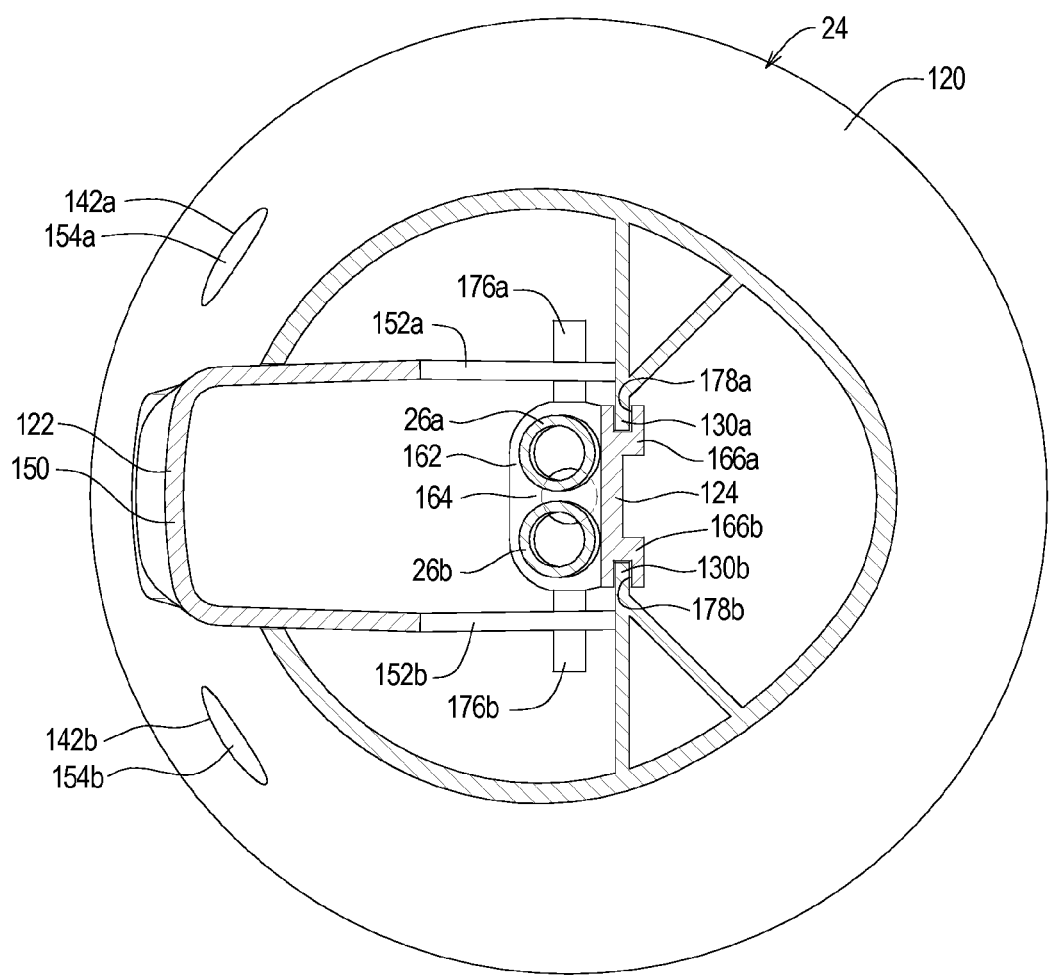
FIG. 5 is a horizontal section view taken along lines 5-5 in FIG. 4.

FIGS. 1, 3, and 4 illustrate a first example aerosol dispensing system 20 constructed in accordance with, and embodying, the principles of the present invention. The first example aerosol dispensing system 20 comprises an aerosol assembly 22, an actuator assembly 24, and at least one outlet tube 26 defining an outlet opening 28. The first example aerosol dispensing system 20 comprises first and second outlet tubes 26a and 26b defining first and second outlet passageways 28a and 28b.

The example outlet passageways 28a and 28b are circular and have a substantially consistent diameter. The outlet tubes 26a and 26b are flexible to allow slight bending but are sufficiently rigid to substantially maintain their shape during normal use as will be described in further detail below.

Figure 2:
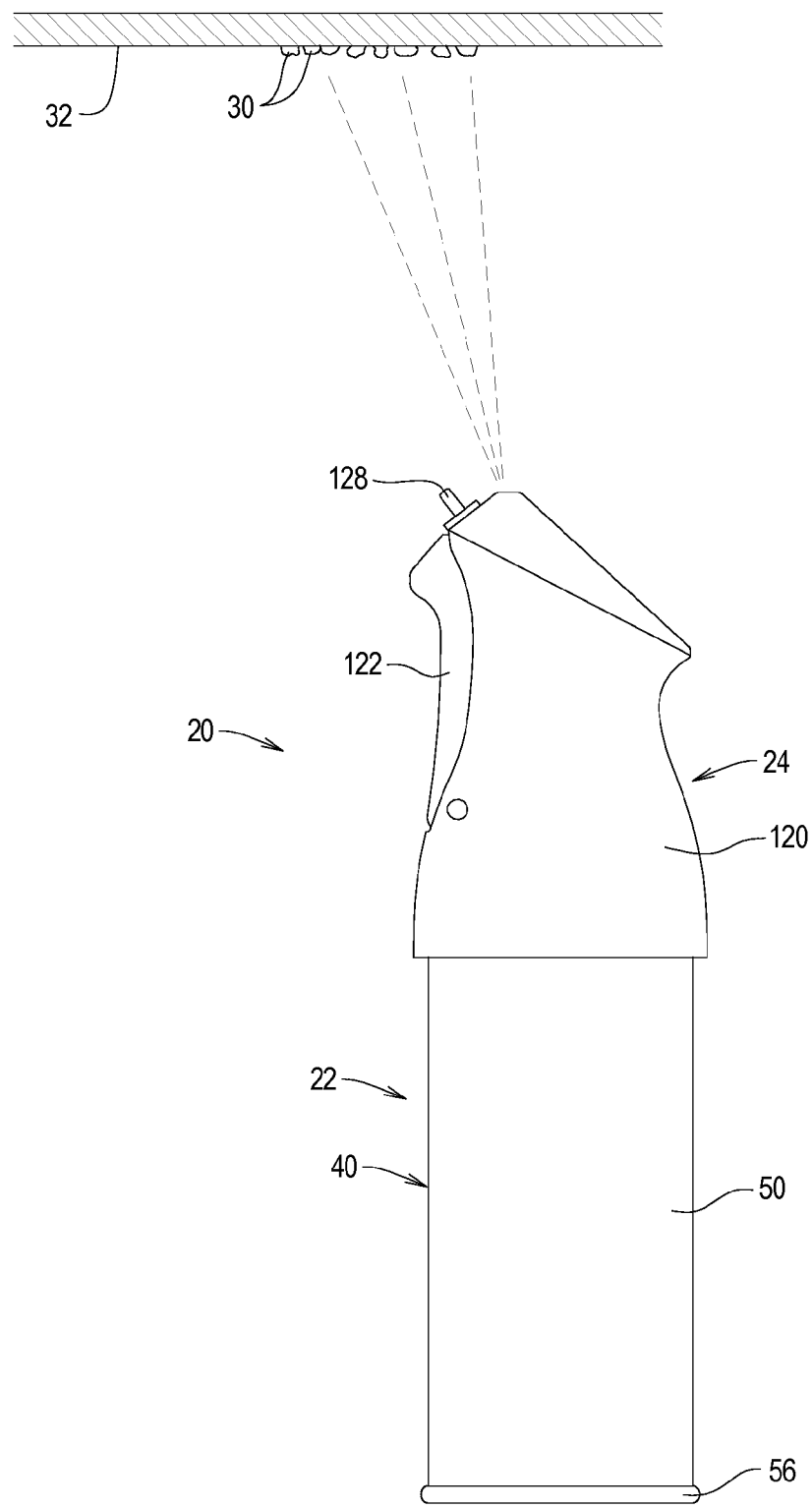
FIG. 2 is a side elevation view illustrating the use of the first example aerosol dispensing system to apply acoustic texture material to a target surface.

FIG. 2 illustrates that the first example aerosol dispensing system 20 is adapted to dispense acoustic texture material 30 onto a target surface 32 to form a texture layer 34. Typically, the target surface will be a downward facing, horizontal surface such as a ceiling surface. In this case, the first example aerosol dispensing system 20 is configured to spray the texture material 30 upwardly with the aerosol assembly 22 in a generally vertical orientation.

The texture material 30 is typically arranged within the aerosol assembly 22 along with a propellant material. The propellant material may be a compressed inert gas such as air or nitrogen that pressurizes the texture material 30. More commonly, however, the propellant material is formed by a material that exists in both liquid and gas forms within the aerosol assembly 22. The gas form of the propellant material pressurizes the texture material 30 such that at least a portion of the texture material 30 is forced out of the aerosol assembly 22 when the valve assembly 42 is opened as described elsewhere herein. As the volume of texture material 30 within the aerosol assembly 22 decreases, the liquid propellant material gasifies to rebuild pressure within the aerosol assembly 22.

The texture material 30 may be formulated in accordance with a first example formulation as set forth in the following Tables A-1, A-2, A-3, and A-4 or a second example formulation as set forth in the following Tables B-1, B-2, B-2, and B-4. While these formulations are particularly suitable for use with an aerosol assembly such as the example aerosol assembly 22 described herein, these formulations may be used with other texture material dispensing systems such as hand pumps, hopper guns, and pump spray bottles.

The following Table A-1 contains a generic example of the first example formulation of a concentrate portion of a solvent-based texture material that may be used to form the texture material 30 in the example aerosol dispensing system 20. The values in the second and third columns of the following Table A-1 are measured as percentage weight of a concentrate portion of the texture material.

TABLE A-1

| Material | First Range | Second Range |
| --- | --- | --- |
| First solvent | 2-10% | 0-15% |
| Second solvent | 2-20% | 0-30% |
| Diluent | 2-15% | 0-20% |
| Binder | 5-10% | 2-15% |
| Thickener | 1-2.5% | 0.5-3% |
| Wetting/dispersing agent | 0.1-1% | 0.1-2% |
| Pigment/Filler | 40-80% | 30-90% |

The choice of solvents is dictated by solubility parameter and vapor pressure. The solubility parameter must be close to that of the binder, so that the binder is easily dissolved. To prompt fast dry, a vapor pressure>0.5 mm Hg is recommended, although not necessary. The diluent is a low-cost liquid with a vapor pressure greater than that of the lowest vapor pressure solvent.

The example first solvent is a medium-evaporating solvent appropriate for use with the selected binder. The example second solvent is a fast evaporating solvent that is also appropriate for use with the example binder. At least one of the first and second solvents must be used to obtain a workable texture material according to Table A-1. The example diluent is a fast evaporating diluent. The example binder is an acrylic resin capable of air drying and binding the solid components of the texture material to the target surface 32 when the texture material dries. Any wetting/dispersing material compatible with the other components of the texture material may be used as the example wetting/dispersing agent.

The thickener is typically at least one of a clay thickener and a fumed silica thickener. In one example, the first example concentrate uses first and second thickeners, where the example first thickener is a clay thickener and the example second thickener is a fumed silica thickener. In this case, the example concentrate described in Table A-1 contains the first thickener is in a first range of 1-2% or in a second range of 0.5-2.0% and the second thickener is in a first range of 0-0.5% or in a second range of 0-1%.

The pigment/filler is selected to provide a desired color to the dried texture material on the target surface and function as a filler to provide bulk to the texture material at low cost.

In one example, the first example concentrate uses first and second pigment/fillers, where the example first pigment/filler is in a first range of 20-40% or in a second range of 0-60% and the second pigment/filler is in a first range of 20-40% or in a second range of 0-60%.

An aerosol material is formed by combining the concentrate portion as set forth in Table A-1 with a propellant material and foaming agent as set forth in the following Table A-2. The values in the second and third columns of the following Table A-2 are measured as percentage weight of the aerosol material that is arranged within the aerosol assembly 22.

TABLE A-2

| Material | First Range | Second Range |
|---|---|---|
| Concentrate portion | 85-93% | 80-95% |
| Foaming agent | 0.1-3% | 0.1-5% |
| Propellant material | 7-13% | 1-20% |

The foaming agent of Table A-2 may be water or another very polar solvent. The propellant material is any hydrocarbon propellant material compatible with the remaining components of the aerosol material.

The following Table A-3 contains a specific example of the first example formulation of a concentrate portion of a solvent-based texture material that may be used to form the texture material 30 in the example aerosol dispensing system 20. The values in the second and third columns of the following Table A-3 are measured as percentage weight of a concentrate portion of the texture material.

TABLE A-3

| Material | Function | Example | First Range | Second Range |
|---|---|---|---|---|
| Diacetone alcohol | First Solvent | 5.2% | 2-10% | 0-15% |
| Denatured ethanol | Second Solvent | 12.30% | 2-20% | 0-30% |
| Hexane | Diluent | 8.44% | 2-15% | 0-20% |
| TB-044 (Dai) | Binder | 8.65% | 5-10% | 2-15% |
| Bentone SD-2 (Elementis) | First thickener | 0.65% | 1-2% | 0.5-2.0% |
| DeGussa R972 | Second thickener | 0.14% | 0-0.5% | 0-1% |
| Byk Antiterra 204 | Wetting/Dispersant | 0.26% | 0.1-1.0% | 0.1-2.0% |
| Calcium carbonate | First Pigment/Filler | 32.18% | 20-40% | 0-60% |
| Minex 4 | Second Pigment/Filler | 32.18% | 20-40% | 0-60% |

At least one of the first and second solvents must be used to obtain a workable texture material according to Table A-3.

An aerosol material is formed by combining the concentrate portion as set forth in Table A-3 with a propellant material and foaming agent as set forth in the following Table A-4. The values in the second and third columns of the following Table A-4 are measured as percentage weight of the aerosol material that is arranged within the aerosol assembly 22.

TABLE A-4

| Material | Function | Example | First Range | Second Range |
|---|---|---|---|---|
| Concentrate portion | Texture Base | 89.00% | 85-93% | 80-95% |
| Water | Foaming agent | 2.00% | 0.1-3.0% | 0.1-5% |
| Hydrocarbon Propellant | Propellant Material | 9.00% | 7-13% | 1-20% |

The hydrocarbon propellant is one or more propellant materials selected from the following group of materials: propane, iso-butane, n-butane, and mixtures thereof.

The following Table B-1 contains a generic example of the second example formulation of a concentrate portion of a water-based texture material that may be used to form the texture material 30 in the example aerosol dispensing system 20. The values in the second and third columns of the following Table B-1 are measured as percentage weight of a concentrate portion of the texture material.

TABLE B-1

| Material | First Range | Second Range |
|---|---|---|
| Solvent | 20-40% | 15-60% |
| Thickener | 0.55-4.5% | 0.31-10.0% |
| De-foamer | 0.1-1% | 0.0-3% |
| Corrosion inhibitor | 0.2-3.0% | 0-5.0% |
| Biocide | 0.2-2.2% | 0-6.0% |
| Binder | 2.0-7.0% | 1.0-10.0% |
| Wetting/dispersing agent | 0.02-1.0% | 0-3.0% |
| Filler | 35.2-80.0% | 20-80% |

The example solvent is water. The example de-foamer is any material capable of performing that function in the context of the entire concentrate formulation. The example binder is a material or mixture of materials that can hold the pigment to the surface. Alkyd resins are the most common resins to be used in solvent-based pigment. Alkyd resins are basically polyesters and are used for both air-drying and heat-cured paints. Vinyl and acrylic are normally in water emulsion forms and used mostly as water-based binders. In any event, the resin should be capable of binding the solid components of the texture material to the target surface 32 when the texture material dries. Any wetting/dispersing material compatible with the other components of the texture material may be used as the example wetting/dispersing agent.

The thickener is typically at least one of a clay thickener and a polymer thickener. In one example, the second example concentrate uses first and second thickeners, where the example first thickener is a clay thickener and the example second thickener is a polymer thickener. In this case, the example concentrate described in Table B-1 contains the first thickener in a first range of 0.5-2.5% or in a second range of 0.3-5.0% and the second thickener is in a first range of 0.05-2.0% or in a second range of 0.01-5.0%.

The corrosion inhibitor is provided to inhibit corrosion of one or more steel components of the aerosol assembly 22. In one example as shown in Table B-1, the second example concentrate uses first and second corrosion inhibitors, where the example first corrosion inhibitor is sodium nitrite and the second corrosion inhibitor an anionic phosphate ester. In this case, the example first corrosion inhibitor is in a first range of 0.1-1.0% or in a second range of 0.0-2.0% and the second corrosion inhibitor is in a first range of 0.1-2.0% or in a second range of 0.0-3.0%.

The filler is selected to provide a desired color to the dried texture material on the target surface and function as a filler to provide bulk to the texture material at low cost. In one example, the second example concentrate uses first and second pigment/fillers, where the example first pigment/filler is calcium carbonate (for example Imasco 200-X) and is in a first range of 35-70.0% or in a second range of 20-80% and the second pigment/filler is talc in a first range of 0.2-10% or in a second range of 0.0-20%.

A texture material of the present invention may be alternatively be defined by viscosity, shear thinning index (STI), and surface tension of the concentrate portion.

The viscosity of a fluid is a measure of the resistance of the fluid to gradual deformation by shear stress or tensile stress. In the case of an example texture material concentrate of the present invention, viscosity may be defined with reference to resistance (coefficient) to flow when the concentrate is subject to a shearing stress. In this context, flow viscosity can be increased by addition of any one or more chemicals called thickeners. Thickeners can be either water soluble or water insoluble but water swellable. Thickeners can also be organic polymers or inorganic clays. The combination of two or more thickeners normally has a synergetic thickening effect. In the example texture material concentrate of the present invention, an organic polymer and an inorganic clay are used together to obtain a desired viscosity as will be described in further detail below, thus yielding a desired performance.

A flow system that has a low viscosity at a high shear yet high viscosity at low shear is said to be shearing thinning. The extent and strength of shearing thinning is characterized by shearing thinning index. The shearing thinning index (STI) can be defined as the ratio of viscosity at 1 RPM and 10 RPM. A texture material concentrate of the present invention should stay on a ceiling surface without flowing, neither flatting nor sagging after it is delivered at the surface. Therefore, the texture material concentrate of the present invention should have a property of viscosity that is sufficiently high to prevent the material from flowing or flatting or sagging, also called zero shearing, at a still condition (e.g., on the ceiling after application). During delivery onto a ceiling surface using, as examples, an aerosol dispensing system or a trigger spray, the texture material concentrate of the present invention should have low viscosity, yielding good flow. Accordingly, the texture material concentrate of the present invention should have a viscosity that is sufficiently low to enable flow through the dispensing system.

Surface tension is a contractive tendency of the surface of a liquid that allows the liquid to resist an external force. In the context of a texture material concentrate of the present invention, surface tension may be defined as a force that resists surface area expansion of the texture material concentrate. When a bulk flow is broken into small droplets by a breaking force or pressure, a total area of the flow increases. This increase in area is resisted by the surface tension of the flowing texture material. The surface tension of a flow thus is proportional to the size of the droplets formed by a given breaking force. In particular, if the flow has a relatively lower surface tension, the same breaking force yields can be broken into smaller droplets by the same breaking force. Further, when the droplets combine on a surface, droplets of material having a relatively large surface tension have a high tendency to aggregate into larger droplets. On the other hand, droplets of material having a relatively low surface tension exhibit a lower tendency to aggregate. Low surface tension of a fluid thus yields small droplets that do not tend to aggregate when in contact on a surface. In the context of the texture material concentrate of the present invention, a concentrate having relatively low surface tension flow tends to form a more featured texture pattern after the concentrate has been delivered onto a ceiling surface.

With these general considerations in mind, a texture material concentrate should have the following viscosity, shear thinning index, and surface tension:

A composition of one example water-based texture material formulation of the present invention should have a viscosity, at 1 RPM with using spindle #7 of Brookfield viscometer, in a first range of approximately between 30,000 and 65,000 cP, a second range of approximately between 20,000 and 80,000 cP, and in any event should be within a third range of approximately between 1000 and 1,000,000 cP.

A composition of one example water-based texture material formulation of the present invention should have a STI value in a first range of approximately between 9 and 12, a second range of approximately between 5 and 20, and in any event should be within a third range approximately between 2 and 30.

A composition of one example water-based texture material formulation of the present invention should have a surface tension of texture flow in concentrate form in a first range of approximately between 30 and 40 mN/m, a second range of approximately between 25 and 60 mN/m, and in any event should be within a third range approximately between 20 and 70 mN/m, more preferred in and most preferred in.

An aerosol material is formed by combining the concentrate portion as set forth in Table B-1 with a propellant material and foaming agent as set forth in the following Table B-2. The values in the second and third columns of the following Table B-2 are measured as percentage weight of the aerosol material that is arranged within the aerosol assembly 22.

TABLE B-2

| Material | First Range | Second Range |
| --- | --- | --- |
| Concentrate portion | 80-89.5 | 75-92 |
| First Propellant material | 10-18 | 8-20 |
| Second Propellant material | 0.5-2.0 | 0-5 |

The propellant material is any hydrocarbon propellant material compatible with the remaining components of the aerosol material. The hydrocarbon propellant is typically one or more liquidized gases either organic (such as dimethyl ether, alkanes that contain carbons less than 6, either straight chain or branched structure, or any organic compounds that are gaseous in normal temperature), or inorganic (such as carbon dioxide, nitrogen gas, or compressed air). The propellants used in current formulations are dimethyl ether (DME) and A-70.

The following Table B-3 contains a specific example of the first example formulation of a concentrate portion of a solvent-based texture material that may be used to form the texture material 30 in the example aerosol dispensing system 20. The values in the second and third columns of the following Table B-3 are measured as percentage weight of a concentrate portion of the texture material.

TABLE B-3

| Material | Function | Example | First Range | Second Range |
| --- | --- | --- | --- | --- |
| Water | Solvent | 34.38% | 20-40% | 15-60% |
| Optigel WX | First thickener (clay type) | 1.12% | 0.5-2.5% | 0.3-5.0% |

TABLE B-3-continued

| Material | Function | Example | First Range | Second Range |
|---|---|---|---|---|
| Rhoboline 675 | De-foamer | 0.08% | 0.1-1% | 0.0-3% |
| Ticagel Konjac High Viscosity | Second thickener (polymer type) | 0.11% | 0.05-2.0% | 0.01-5.0% |
| Sodium nitrite | First corrosion inhibitor | 0.25% | 0.1-1.0% | 0-2.0% |
| Bioban | Biocide | 0.21% | 0.1-1.1% | 0-3.0% |
| Mergal 174 | Biocide | 0.20% | 0.1-1.1% | 0-3.0% |
| Walpol DX-101 | Binder | 4.66% | 2.0-7.0% | 1.0-10.0% |
| KTTP | Wetting/ dispersing agent | 0.50% | 0.02-1.0% | 0-3.0% |
| Afilan AKT 300 | Second corrosion inhibitor | 0.36% | 0.1-2.0% | 0-3% |
| Imasco 200-X CaCO3 | First filler | 53.83% | 35-70% | 20-80% |
| Nicron 403 talc | Second filler | 4.66% | 0.2-10.0% | 0-20% |

An aerosol material is formed by combining the concentrate portion as set forth in Table B-3 with a propellant material and foaming agent as set forth in the following Table B-4. The values in the second and third columns of the following Table B-4 are measured as percentage weight of the aerosol material that is arranged within the aerosol assembly 22.

TABLE B-4

| Material | Function | Example | First Range | Second Range |
|---|---|---|---|---|
| Concentrate portion | Texture Base | 85 | 80-89.5 | 75-92 |
| DME | First Propellant | 14 | 10-18 | 8-20 |
| A-70 | Second Propellant | 1.0 | 0.5-2.0 | 0-5 |

The propellant material is any hydrocarbon propellant material compatible with the remaining components of the aerosol material. The hydrocarbon propellant is typically one or more liquidized gases either organic (such as dimethyl ether, alkanes that contain carbons less than 6, either straight chain or branched structure, or any organic compounds that are gaseous in normal temperature), or inorganic (such as carbon dioxide, nitrogen gas, or compressed air). The propellants used in current formulations are dimethyl ether (DME) and A-70.

Turning now to FIG. 4, the example aerosol assembly 22 will now be described in further detail. The example aerosol assembly 22 comprises a container assembly 40, a valve assembly 42, and a dip tube 44. FIGS. 2 and 4 illustrate that the container assembly 40 comprises a container 50, a cap 52, a cup 54, and a bottom plate 56. The cap 52 is connected to the container 50 at a crimp portion 58. The bottom plate 56 is attached to the container 50. The cup 54 is supported by the cap 52 to form the container assembly 40. The valve assembly 42 comprises a valve housing 60 and a valve stem 62. The valve housing 60 is supported by the cup 54 such that fluid may flow into and out of the container assembly 40 only through the valve assembly 42. The valve assembly 42 is normally resiliently biased into a closed configuration in which fluid flow into and out of the container assembly 40 is substantially prevented. Displacing the valve stem 62 towards the valve housing 60 places the valve assembly 42 in an open configuration to allow fluid flow into and out of the container assembly 40. The dip tube 44 extends from the valve housing 60 to a bottom portion of the container assembly 40.

A valve assembly such as Model No. SV-77, vertical action valve, from Summit Packaging Systems, with a male valve stem may be used as the valve assembly 42. Other aerosol valves such as Model AR83 from Aptar Group, Inc. or valves from Clayton Valve Corporation such as Model No. 1001000703, may be used, perhaps with slight modification to the actuator assembly to accommodate fluid communication between the valve assembly 42 and the outlet tube(s) 26.

FIG. 4 further illustrates that the actuator assembly 24 comprises an actuator housing 120, a trigger 122, an adapter 124, an outlet member 126, and a lock member 128.

Figure 6:
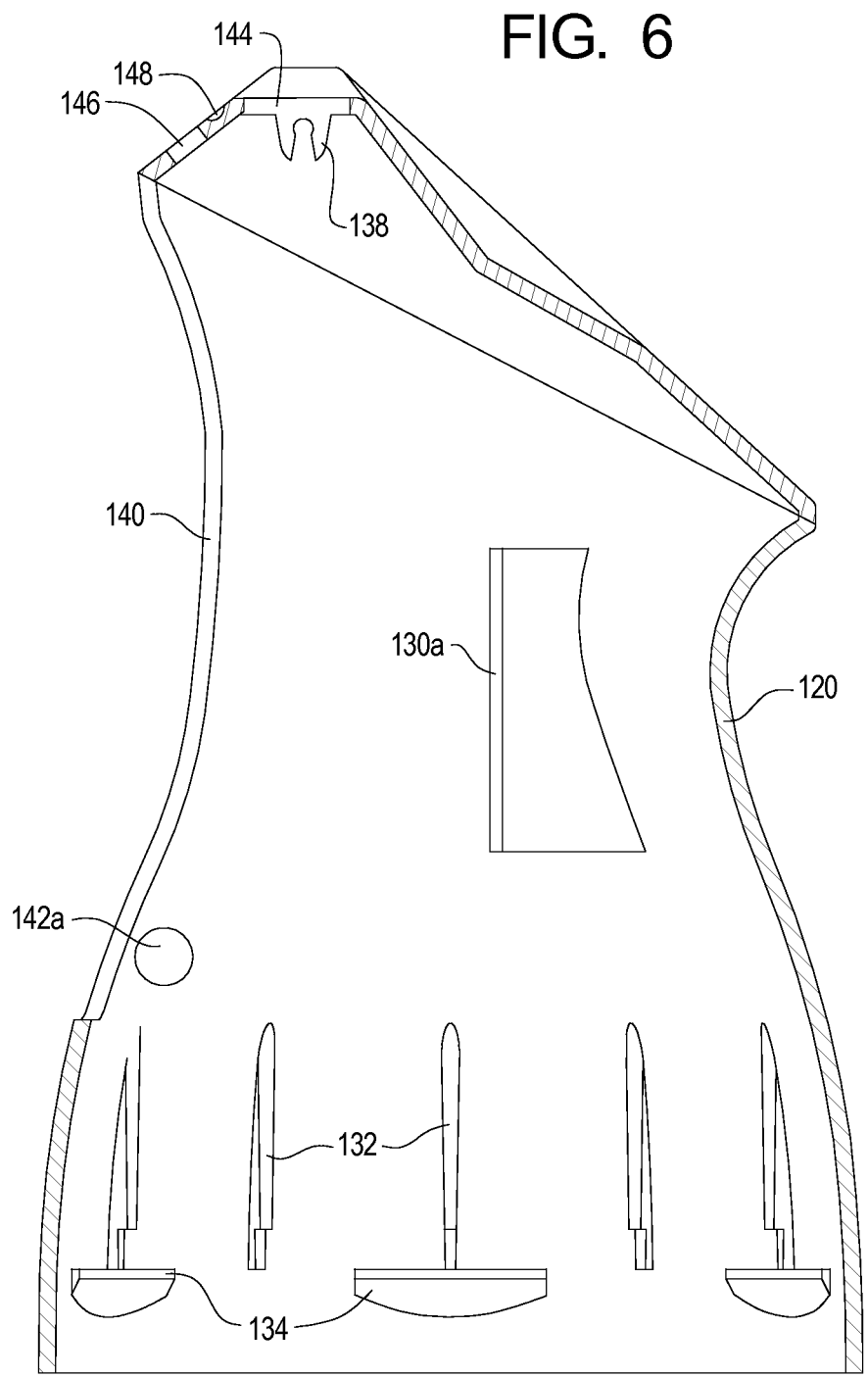
FIG. 6 is a vertical section view of the actuator housing of the actuator assembly of the first example aerosol dispensing system.
Figure 7:
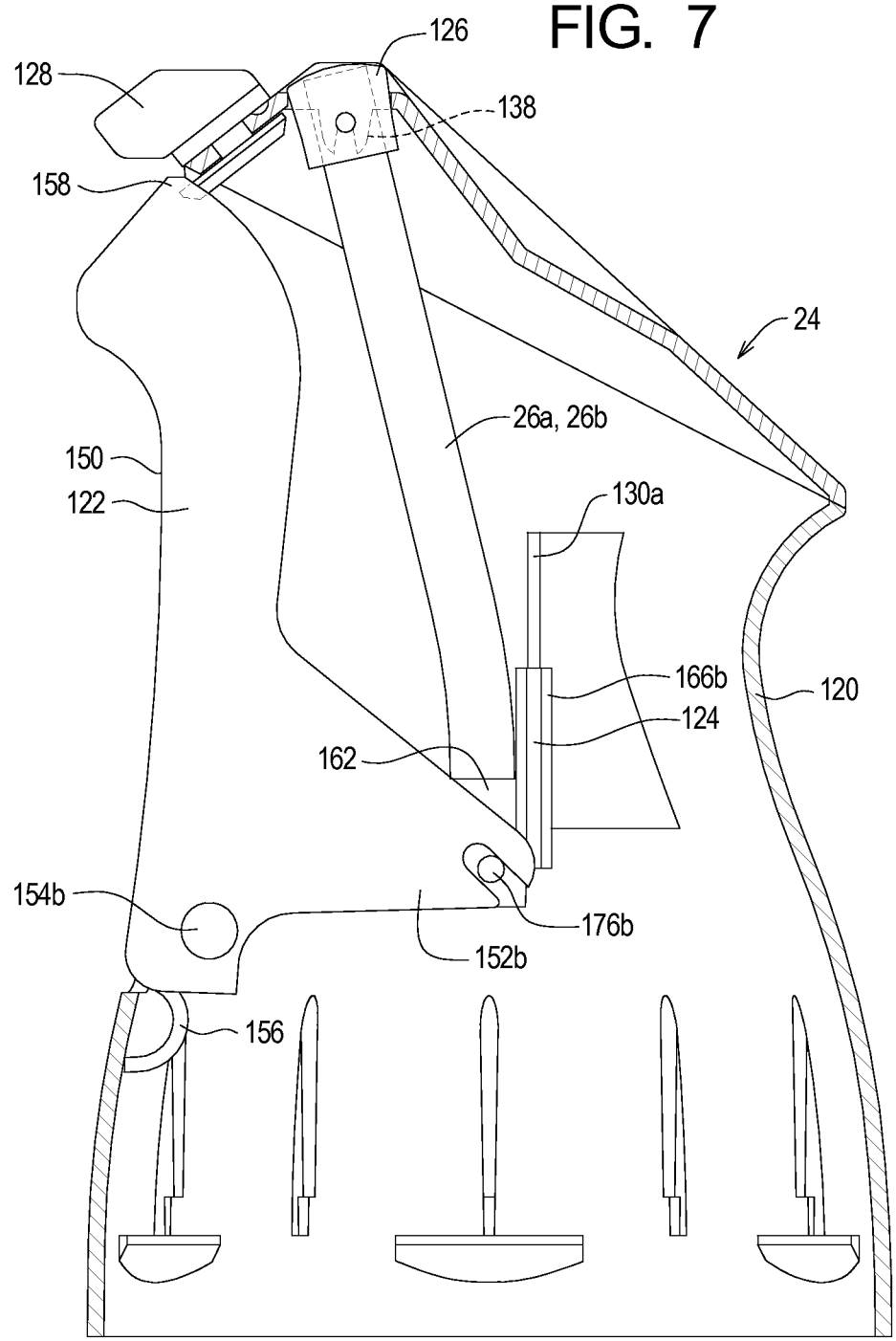
FIG. 7 is a vertical section view depicting the interaction between the actuator housing and a trigger of the actuator assembly of the first example aerosol dispensing system.
Figure 8:
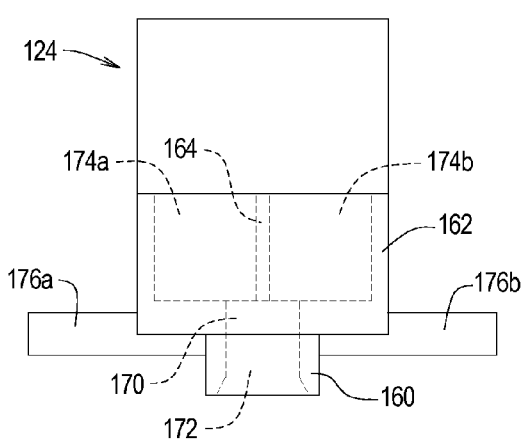
FIG. 8 is a front elevation view of a first example adapter of the actuator assembly of the first example aerosol dispensing system.
Figure 11:
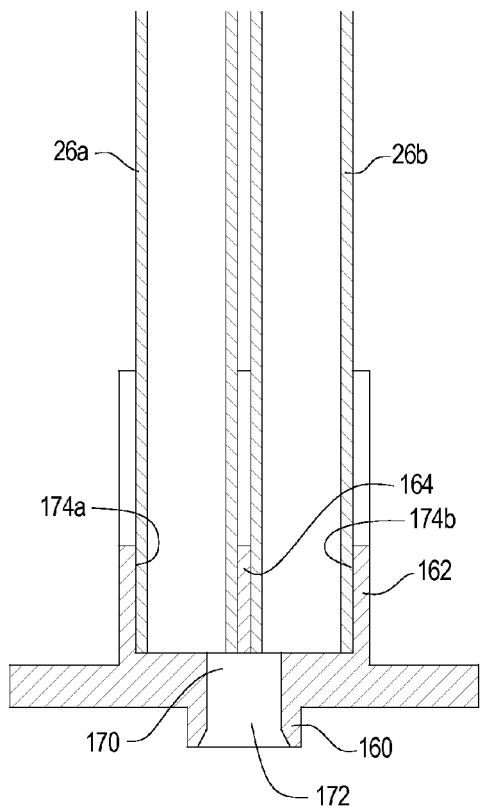
FIG. 11 is a section view illustrating the engagement of the first example adapter with the outlet tubes.
Figure 9:
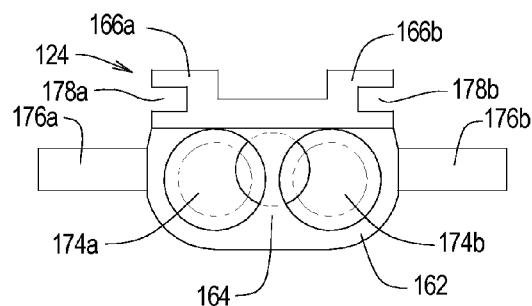
FIG. 9 is a top plan view of the first example adapter.
Figure 10:
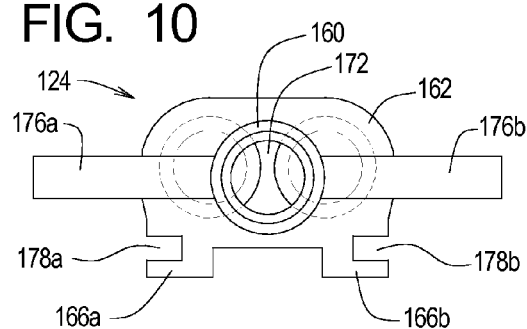
FIG. 10 is a bottom plan view of the first example adapter.

As shown in FIGS. 4 and 6, the actuator housing 120 comprises first and second rail portions 130a and 130b, a plurality of clip projections 132, a plurality of stop projections 134, and a pair of outlet projections 138 (only one visible). The actuator housing 120 further defines a trigger opening 140, first and second pivot openings 142a and 142b, an outlet channel 144, a lock opening 146, and a locating recess 148.

The example trigger 122 defines a finger wall 150, first and second lever portions 152a and 152b, and first and second pivot portions 154a and 154b, a return portion 156, and a lock portion 158. The finger wall 150 is arranged between the biasing portion 156 and the lock portion 158. The lever portions 152a and 152b are offset in a first direction from a trigger reference plane defined by the first and second pivot portions 154a and 154b and the stop portion 156. The biasing portion 156 is offset in a second direction from the trigger reference plane.

The adapter 124 comprises a stem portion 160, an outlet portion 162, an outlet divider 164, and first and second slot projections 166a and 166b. The adapter 124 defines an adapter opening 170. The stem portion 160 defines a stem cavity 172. The outlet portion 162 defines an outlet cavity 174 that is divided into first and second outlet cavity portions 174a and 174b by the outlet divider 164. First and second lever projections 176a and 176b extend from the adapter 124. First and second rail slots 178a and 178b are formed in the slot projections 166a and 166b, respectively. Although the example stem portion 160 defines a stem cavity 172 configured to engage the example valve stem 62, the stem portion 160 may be configured as a projection adapted to engage a valve assembly using a female actuator. The size and dimensions of the stem portion 160 may thus be altered as necessary to accommodate different valve assemblies having different dimensions and actuator configurations.

The outlet member 126 comprises a perimeter wall 180 defining an outlet passage 182 and a pair of attachment projections 184 (only one visible).

Figure 12:
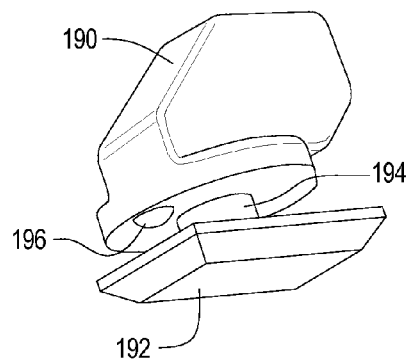
FIG. 12 is a perspective view of a lock member of the actuator assembly of the first example aerosol dispensing system.
Figure 13:
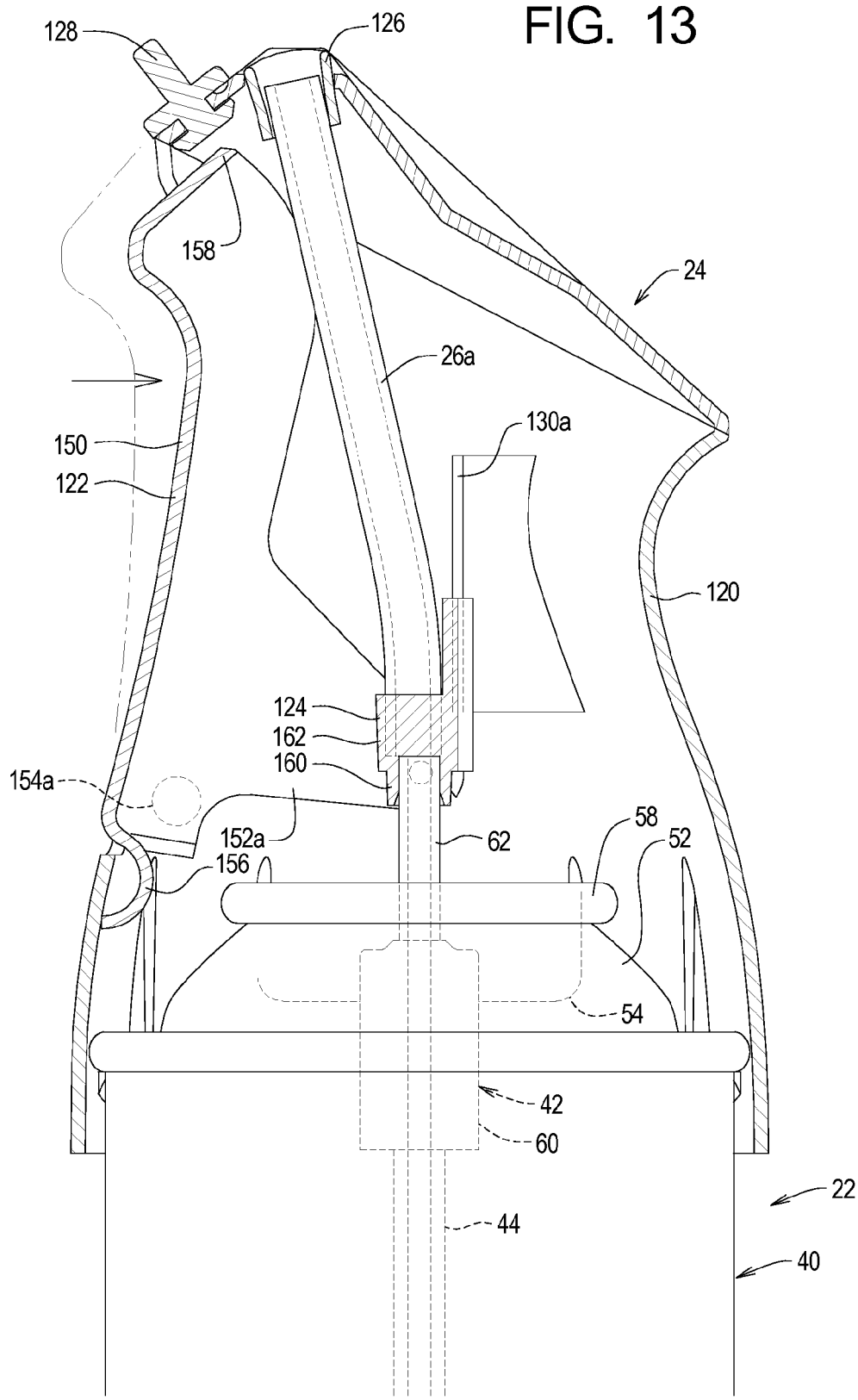
FIG. 13 is a partial section view illustrating interaction of the actuator assembly of the first example aerosol dispensing system with a valve assembly of the aerosol assembly.
Figure 14:
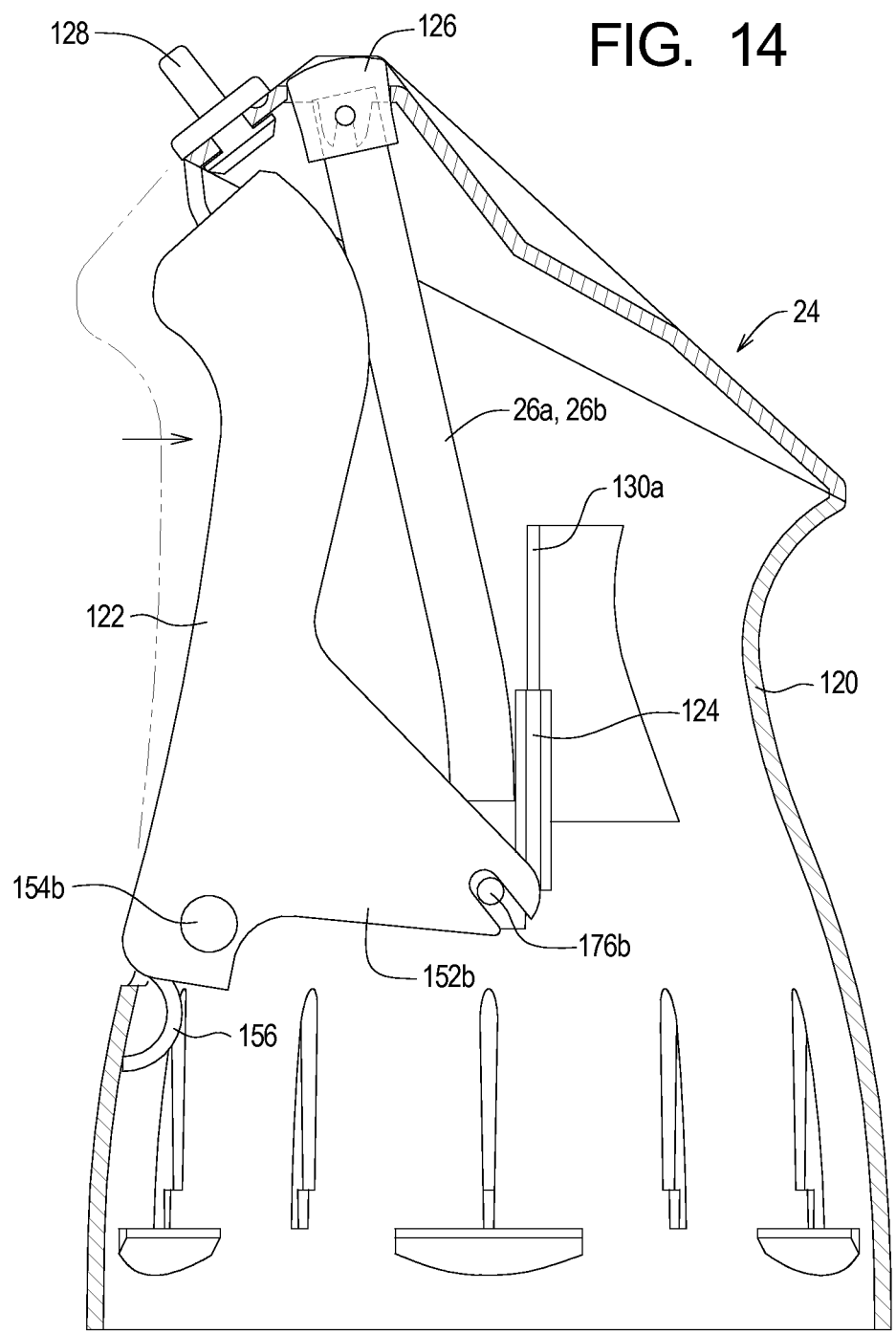
FIG. 14 is a partial section view illustrating operation of the actuator assembly.

As perhaps best shown in FIGS. 4 and 12, the example lock member 128 comprises a handle portion 190, lock portion 192, spacing portion 194, and locating projection 196. The lock portion 192 is inserted through the lock opening 146 such that the lock portion 192 is inside the actuator housing 120 and the handle portion 190 is outside of the actuator housing 120. The spacing portion 194 is approximately the same dimension as a thickness of the actuator housing 120 around the lock opening 146. Rotation of the handle portion 190 places the lock member 128 in a latched position as shown in FIG. 4 and an unlatched position as shown in FIGS. 13 and 14. The lock portion 192 engages the trigger 122 when the trigger 122 is in the first position and the lock member 128 is in the latched position to prevent movement of the trigger 122 out of the first position. When the lock member 128 is in the unlatched position, the lock portion 192 no longer engages the trigger 122, and the trigger 122 may be displaced out of the first position. The locking projection 196 engages one of the locating recesses 148 to secure the lock member 128 in either the latched position or the unlatched position.

To assemble the actuator assembly 24, the adapter 124 is detachably attached to the outlet tubes 26a and 26b as shown, for example, in FIGS. 4, 7, 11, 13, and 14. At the same time, the outlet projections 138 receive the attachment projections 184 to detachably attach the outlet member 126 to the actuator housing 120 such that the outlet member 126 is located within the outlet channel 144. The adapter 124 is then arranged such that the rail slots 178a and 178b receive the rail portions 130a and 130b to allow limited linear movement of the adapter 124 relative to the actuator housing 120. The outlet tubes 26a and 26b are inserted into the outlet passage 182 such that outlet passageways 28a and 28b are substantially flush with the surface of the actuator housing 120 surrounding the outlet opening 144.

The trigger 122 is next arranged within the trigger opening 140 such that the finger wall 150 is located outside the actuator housing 120, the lever portions 152a and 152b engage the lever projections 176a and 176b, and the pivot portions 154a and 154b engage the pivot openings 142a and 142b, respectively. In this configuration, the trigger 122 is rotatable relative to the actuator housing 120 between a first position as shown in FIG. 4 and a second position as shown in FIGS. 13 and 14. In the first example aerosol dispensing system 20, the return portion 156 engages the actuator housing 120 such that the return portion 156 is un-deformed when the trigger 122 is in the first position and deforms when the trigger 122 is pivoted into the second position. The return portion 156 is resiliently deformable such that the return portion 156 biases the trigger 122 from the second position towards the first position.

As generally described above, the lock member 128 is supported by the actuator housing 120 for rotation between the latched position as shown in FIGS. 1, 3, 4, and 7 and the unlatched position as shown in FIGS. 2, 13, and 14. With the lock member 128 in the locked position and the trigger member 122 in the first position, the lock member 128 engages the lock portion 158 of the trigger member 122 to inhibit movement of the trigger member 122 out of the first position. With the lock member 128 in the unlocked position, the lock member 128 does not engage the lock portion 158, and the trigger member 122 may be moved from the first position towards the second position.

With the actuator assembly 24 formed as described above, the actuator assembly 24 is next attached to the aerosol assembly 22 to form the aerosol dispensing system 20. In particular, the actuator assembly 24 and outlet tubes 26a and 26b supported thereby are displaced such that the crimp portion 58 of the container assembly 40 is arranged between the clip projections 132 and the stop projections 134. At the same time, the valve stem 62 enters the stem cavity 172 defined by the adapter 124. At this point, a dispensing path is defined that extends from the interior of the container assembly 40, through the dip tube 44, through the valve housing 60, through the valve stem 62, through the adapter opening 170, through the outlet tubes 26a and 26b, and out through the outlet passageways 28a and 28b.

With the lock member 128 in the unlocked position, applying pressure on the finger wall 150 as shown by the arrow in FIG. 13 causes the trigger 122 to rotate from the first position towards the second position. The geometry of the trigger 122 and the arrangement of the lever portions 152a and 152b relative to the pivot portions 154a and 154b translates the pivoting movement of the trigger 122 into linear movement adapter 124 towards the valve housing 60. When the trigger 122 is in the first position, the valve assembly 42 is in its closed configuration. When the trigger 122 is in the second position, the valve assembly 42 is in its open configuration. The internal biasing force applied between the valve housing 60 and the valve stem 62 is added to the biasing force applied by the return portion 156 on the trigger 122 to bias the trigger 122 into the first position.

Turning now to FIGS. 8-11 of the drawing, it can be seen that an effective cross-sectional area of the dispensing path at the adapter opening 170 is smaller than an effective cross-sectional area of the dispensing path created by the cumulative cross-sectional areas of the outlet passageways 28a and 28b defined by the outlet tubes 26a and 26b. Further, the adapter opening 170 is offset from the outlet tubes 26a and 26b such that a restriction is formed at the juncture of the adapter opening and the outlet passageway 28a and 28b. The following Table C-1 contains the cross-sectional area of the example adapter opening 170 and the cumulative cross-sectional area of the outlet passageways 28a and 28b:

TABLE C-1

| Dimension | Example | First Preferred Range | Second Preferred Range |
| --- | --- | --- | --- |
| adapter opening | 12.97 mm$^2$ | 6 mm$^2$-13 mm$^2$ | 12 mm-32 mm$^2$ |
| outlet passageways | 19.24 mm$^2$ | 2 mm$^2$-20 mm$^2$ | 13 mm$^2$-80 mm$^2$ |

Figure 15:
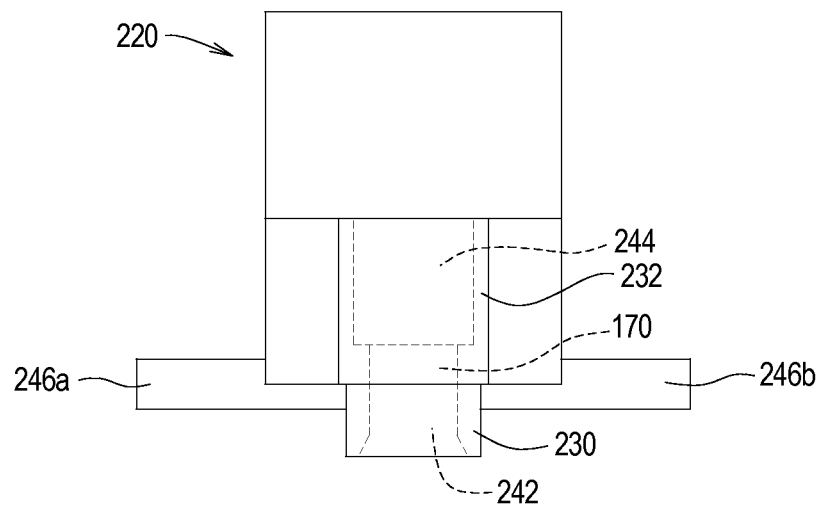
FIG. 15 is a front elevation view of a second example adapter that may be used by an actuator assembly of the first example aerosol dispensing system.
Figure 16:
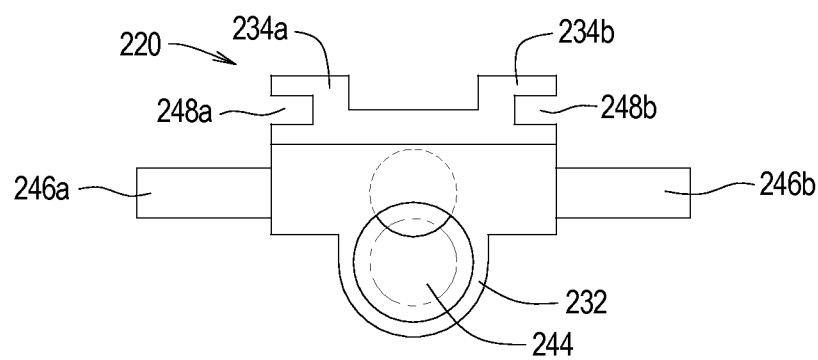
FIG. 16 is a top plan view of the second example adapter.
Figure 17:
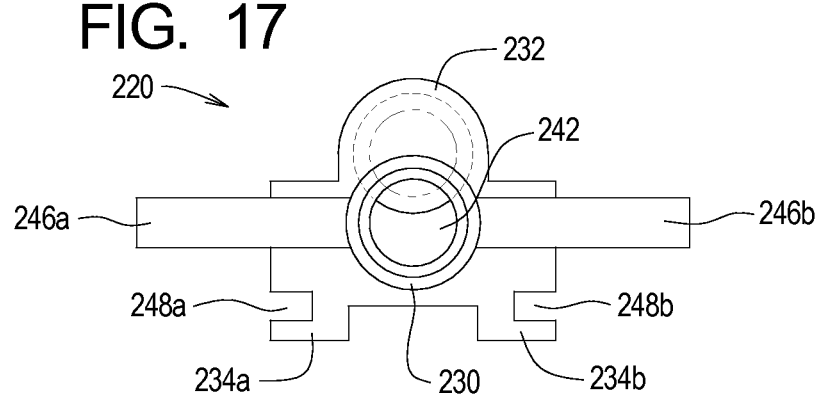
FIG. 17 is a bottom plan view of the second example adapter.

Turning now to FIGS. 15-17 of the drawing, depicted therein is a second example adapter 220 that may be used in place of the first example adapter 124 described above. The second example adapter 220 comprises a stem portion 230, an outlet portion 232, and first and second slot projections 234a and 234b. The second example adapter 220 defines an adapter opening 240. The stem portion 230 defines a stem cavity 242. The outlet portion 232 defines an outlet cavity 244. First and second lever projections 246a and 246b extend from the adapter 220. First and second rail slots 248a and 248b are formed in the slot projections 246a and 246b, respectively.

The second example adapter 220 is configured to engage only a single outlet tube 26, which defines an outlet passageway 28. Accordingly, an effective cross-sectional area of the dispensing path at the adapter opening 240 is similar to the cross-sectional area of the dispensing path created by the outlet passageway 28 defined by the single outlet tube 26. The adapter opening 240 is offset from the single outlet tube 26 such that a restriction is formed at the juncture of the adapter opening 240 and the outlet passageway 28. The following Table C-2 contains the cross-sectional area of the example adapter opening 240 and the cross-sectional area of the outlet passageway 28:

TABLE C-2

| Dimension | Example | First Preferred Range | Second Preferred Range |
| --- | --- | --- | --- |
| adapter opening | 12.97 mm$^2$ | 6 mm$^2$-13 mm$^2$ | 12 mm$^2$-32 mm$^2$ |
| outlet passageway | 9.62 mm$^2$ | 1 mm$^2$-10 mm$^2$ | 8 mm$^2$-40 mm$^2$ |

Figure 18:
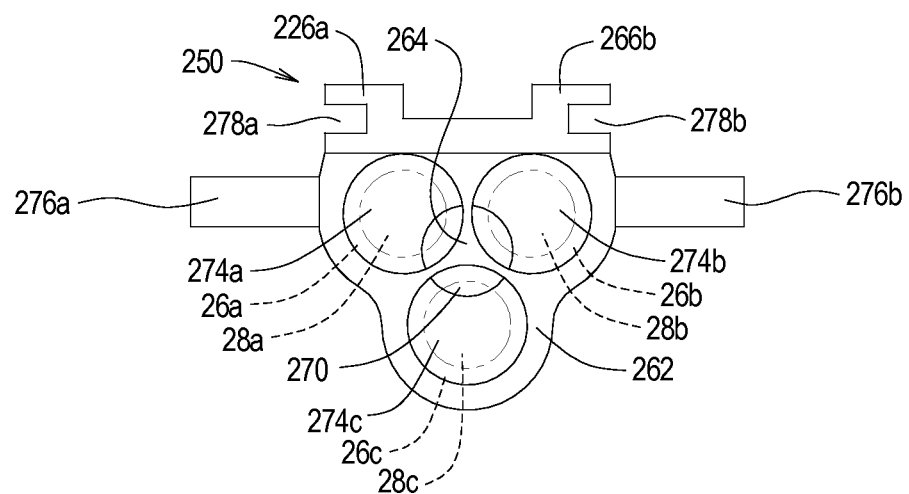
FIG. 18 is a top plan view of a third example adapter.
Figure 19:
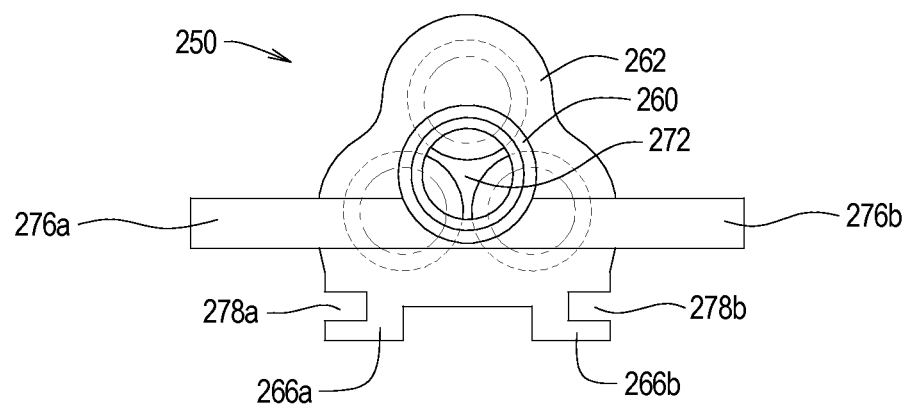
FIG. 19 is a bottom plan view of the third example adapter.

Turning now to FIGS. 18 and 19 of the drawing, depicted therein is a third example adapter 250 that may be used in place of the first example adapter 124 described above. The third example adapter 250 comprises a stem portion 260, an outlet portion 262, an outlet divider 264, and first and second slot projections 266a and 266b. The third example adapter 250 defines an adapter opening 270. The stem portion 260 defines a stem cavity 172. The outlet portion 262 defines an outlet cavity 274 that is divided into first, second, and third outlet cavity portions 174a, 174b, and 174c by the outlet divider 264. First and second lever projections 276a and 276b extend from the adapter 250. First and second rail slots 278a and 278b are formed in the slot projections 266a and 266b, respectively.

The third example adapter 250 is configured to engage only three outlet tubes 26a, 26b, and 26c, each defining an outlet passageway 28a, 28g, and 28c. Accordingly, an effective cross-sectional area of the dispensing path at the adapter opening 270 is less than the cumulative cross-sectional area of the dispensing path created by the outlet passageways 28a, 28b, and 28c defined by the three outlet tubes 26a, 26b, and 26c. The adapter opening 270 is offset from the outlet tubes 26a, 26b, and 26c such that a restriction is formed at the juncture of the adapter opening 270 and the outlet passageways 28a, 28b, and 28c. The following Table C-3 contains examples of the cross-sectional area of the example adapter opening 270 and the cumulative cross-sectional areas of the outlet passageways 28a, 28b, and 28c:

TABLE C-3

| Dimension | Example | First Preferred Range | Second Preferred Range |
|---|---|---|---|
| adapter opening | 12.97 mm$^2$ | 6 mm$^2$-13 mm$^2$ | 12 mm$^2$-32 mm$^2$ |
| outlet passageways | 25.65 mm$^2$ | 6 mm$^2$-26 mm$^2$ | 25 mm$^2$-100 mm$^2$ |

From the foregoing, it should be apparent that the present invention may be embodied in forms other than those specifically discussed above. The scope of the present invention should thus be determined by the claims appended hereto and not the foregoing detailed description of examples of the invention.

What is claimed is:

1. An aerosol dispensing system for forming a texture layer on a target surface, comprising:
   an aerosol assembly adapted to contain acoustic texture material, where the aerosol assembly comprises
      a container assembly, and
      a valve assembly arrange to operate in open and closed configurations, where
         the valve assembly is biased in the closed position, and
         the valve assembly is supported by the container assembly such that the acoustic texture material is allowed to flow out of the container assembly when the valve assembly is in the open configuration and the acoustic texture material is prevented from flowing out of the container when the valve assembly is in the closed configuration;
   an actuator assembly comprising
      a housing,
      at least one rail portion secured relative to the housing,
      a trigger, and
      an adapter defining an adapter opening and at least one rail slot, where
         the housing supports the trigger for pivoting movement between first and second trigger positions,
         the at least one rail portion engages the at least one rail slot such that the housing supports the adapter for linear movement between first and second adapter positions,
         the trigger engages the adapter to displace the adapter from the first adapter position to the second adapter position as the trigger moves from the first trigger position to the second trigger position, and
         the adapter engages the valve assembly such that
            the valve assembly is in the closed configuration when the adapter is in the first adapter position,
            the adapter moves the valve assembly into the open configuration when the adapter is in the second adapter position, and
            when the valve assembly is in the open configuration, acoustic texture material flows from the valve assembly and through the adapter opening; and
   at least one outlet tube defining an outlet passageway and an outlet opening; where
      the adapter supports the at least one outlet tube such that acoustic texture material flowing through the adapter opening when the valve assembly is in the open configuration flows into the outlet passageway, and
      the outlet tube is arranged such that acoustic texture material flowing through the outlet passageway flows out of the outlet opening and out of the housing.

2. An aerosol dispensing system as recited in claim 1, in which:
   the actuator assembly further comprises a lock member supported by the housing for movement between first and second lock positions;
   the lock member prevents movement of the trigger out of the first trigger position when the lock member is in the first lock position; and
   the lock member allow of the trigger from the first trigger position to the second trigger position when the lock member is in the second lock position.

3. An aerosol dispensing system as recited in claim 1, in which:
   the housing defines an outlet channel;
   the actuator assembly further comprises an outlet member supported by the housing within the outlet channel; and
   the outlet member supports the at least one outlet tube such that acoustic texture material flowing out of the outlet opening passes through the outlet channel.

4. An aerosol dispensing system as recited in claim 1, in which the adapter defines:
   a stem portion adapted to engage the valve assembly; and
   an outlet portion adapted to engage the at least one outlet tube.

5. An aerosol dispensing system as recited in claim 4, in which:
   the stem portion defines a stem cavity for receiving a stem of the valve assembly; and
   the outlet portion defines an outlet cavity for receiving an end of the at least one outlet tube.

6. An aerosol dispensing system as recited in claim 1, comprising one outlet tube.

7. An aerosol dispensing system as recited in claim 1, comprising a plurality of the outlet tubes, where the adapter supports the plurality of the outlet tubes such that:
   acoustic texture material flowing through the adapter opening when the valve assembly is in the open configuration flows into the outlet passageways of the plurality of outlet tubes, and the outlet tubes are arranged such that acoustic texture material flowing through the outlet passageways flows out of the outlet openings and out of the housing.

8. An aerosol dispensing system as recited in claim 7, comprising two outlet tubes.

9. An aerosol dispensing system as recited in claim 7, comprising three outlet tubes.

10. An dispensing system as recited in claim 1, in which a return portion of the trigger engages the housing such that return portion resiliently deforms when the trigger moves from the first position to the second position to bias the trigger towards the first position.

11. An aerosol dispensing system as recited in claim 1, in which the acoustic texture material comprises:
- a first solvent, where the first solvent comprises between 0% and 15% by weight of a concentrate portion of the acoustic texture material;
- a second solvent, where the second solvent comprises between 0% and 30% by weight of the concentrate portion of the acoustic texture material;
- a diluent, where the diluent comprises between 0% and 20% by weight of the concentrate portion of the acoustic texture material;
- a binder, where the binder comprises between 2% and 15% by weight of the concentrate portion of the acoustic texture material;
- a thickener, where the thickener comprises between 0.5% and 3% by weight of the concentrate portion of the acoustic texture material;
- a dispersing agent, where the dispersing agent comprises between 0.1% and 2% by weight of the concentrate portion of the acoustic texture material; and
- a filler, where the filler comprises between 30% and 90% by weight of the concentrate portion of the acoustic texture material.

12. An aerosol dispensing system as recited in claim 1, in which the acoustic texture material comprises:
- a first solvent, where the first solvent comprises between 2% and 10% by weight of a concentrate portion of the acoustic texture material;
- a second solvent, where the second solvent comprises between 2% and 20% by weight of the concentrate portion of the acoustic texture material;
- a diluent, where the diluent comprises between 2% and 15% by weight of the concentrate portion of the acoustic texture material;
- a binder, where the binder comprises between 5% and 10% by weight of the concentrate portion of the acoustic texture material;
- a thickener, where the thickener comprises between 1% and 2.5% by weight of the concentrate portion of the acoustic texture material;
- a dispersing agent, where the dispersing agent comprises between 0.1% and 1% by weight of the concentrate portion of the acoustic texture material; and
- a filler, where the filler comprises between 40% and 80% by weight of the concentrate portion of the acoustic texture material.

13. An aerosol dispensing system as recited in claim 1, in which the acoustic texture material comprises:
- a solvent, where the solvent comprises between 15% and 60% by weight of a concentrate portion of the acoustic texture material;
- a thickener, where the thickener comprises between 0.31% and 10.0% by weight of the concentrate portion of the acoustic texture material;
- a de-foamer, where the de-foamer comprises between 0.0% and 3.0% by weight of the concentrate portion of the acoustic texture material;
- a corrosion inhibitor, where the corrosion inhibitor comprises between 0% and 5.0% by weight of the concentrate portion of the acoustic texture material;
- a biocide, where the biocide comprises between 0% and 6% by weight of the concentrate portion of the acoustic texture material;
- a binder, where the binder comprises between 1.0% and 10.0% by weight of the concentrate portion of the acoustic texture material;
- a dispersing agent, where the dispersing agent comprises between 0.0% and 3.0% by weight of the concentrate portion of the acoustic texture material; and
- a filler, where the filler comprises between 20% and 90% by weight of the concentrate portion of the acoustic texture material.

14. An aerosol dispensing system as recited in claim 1, in which the acoustic texture material comprises:
- a solvent, where the solvent comprises between 20% and 40% by weight of a concentrate portion of the acoustic texture material;
- a thickener, where the thickener comprises between 0.55% and 4.5% by weight of the concentrate portion of the acoustic texture material;
- a de-foamer, where the de-foamer comprises between 0.1% and 1.0% by weight of the concentrate portion of the acoustic texture material;
- a corrosion inhibitor, where the corrosion inhibitor comprises between 0.2% and 3.0% by weight of the concentrate portion of the acoustic texture material;
- a biocide, where the biocide comprises between 0.2% and 2.2% by weight of the concentrate portion of the acoustic texture material;
- a binder, where the binder comprises between 2.0% and 7.0% by weight of the concentrate portion of the acoustic texture material;
- a dispersing agent, where the dispersing agent comprises between 0.02% and 1.0% by weight of the concentrate portion of the acoustic texture material; and
- a filler, where the filler comprises between 35.2% and 80% by weight of the concentrate portion of the acoustic texture material.

* * * * *